United States Patent [19]

LaCaze

[11] Patent Number: 5,054,092
[45] Date of Patent: Oct. 1, 1991

[54] HAND-OPERATED LOW COST MAGNETIC CHARACTER RECOGNITION SYSTEM

[75] Inventor: John R. LaCaze, Owens Cross Roads, Ala.

[73] Assignee: Checkmate Electronics, Inc., Atlanta, Ga.

[21] Appl. No.: 175,981

[22] Filed: Mar. 31, 1988

Related U.S. Application Data

[63] Continuation-in-part of Ser. No. 46,653, May 5, 1987, abandoned, and a continuation-in-part of Ser. No. 46,654, May 6, 1987, abandoned.

[51] Int. Cl.$^5$ .............................................. G06K 9/18
[52] U.S. Cl. .................................... 382/11; 382/7; 382/1; 235/449
[58] Field of Search ................... 382/63, 11, 37, 64, 382/21, 57, 1, 8, 7, 29; 235/449, 493, 494, 379, 474, 436; 209/562, 567, 569

[56] References Cited

U.S. PATENT DOCUMENTS

| | | | |
|---|---|---|---|
| 3,528,058 | 9/1970 | Bond | 382/29 |
| 3,535,682 | 10/1970 | Dykaar et al. | 324/77 |
| 3,876,981 | 4/1975 | Welch | 340/146.3 D |
| 3,914,789 | 7/1975 | Coker, Jr. et al. | 360/2 |
| 4,015,701 | 4/1977 | Templeton | 197/127 R |
| 4,053,737 | 10/1977 | Lafevers et al. | 235/61.11 D |
| 4,063,070 | 12/1977 | Delarue et al. | 235/474 |
| 4,087,789 | 5/1978 | Beery | 340/146.3 |
| 4,107,653 | 8/1978 | Kruklitis | 340/146.3 C |
| 4,127,770 | 11/1978 | Baader | 235/474 |
| 4,143,355 | 3/1979 | MacIntyre | 340/146.3 C |
| 4,176,783 | 6/1979 | Eppich | 235/474 |
| 4,260,880 | 4/1981 | Thomas | 235/454 |
| 4,277,689 | 11/1981 | Thomas et al. | 250/567 |
| 4,356,472 | 10/1982 | Hau-chun Ku et al. | 340/146.3 |
| 4,381,494 | 4/1983 | Wisner | 382/64 |
| 4,399,553 | 8/1983 | Toyama | 382/7 |
| 4,441,204 | 4/1984 | Hanna | 382/7 |
| 4,510,615 | 4/1985 | Rohrer | 382/7 |
| 4,523,330 | 6/1985 | Cain | 382/7 |
| 4,547,899 | 10/1985 | Nally et al. | 382/7 |
| 4,776,021 | 10/1988 | Ho | 382/7 |

FOREIGN PATENT DOCUMENTS 1331170 7/1973 United Kingdom .
1591010 12/1981 United Kingdom .
2157040 1/1985 United Kingdom .

OTHER PUBLICATIONS

KeyTronic, Inc., Tacoma, Washington, article on R1150 Series, Hand-Held Wand.

(List continued on next page.)

Primary Examiner—Michael Razavi
Attorney, Agent, or Firm—Nixon & Vanderhye

[57] ABSTRACT

A low cost, highly accurate hand operated magnetic character recognition document reader magnetically recognizes magnetic ink (MICR) characters imprinted on documents manually conveyed past a magnetic read head. The reader incorporates the invention described in commonly assigned U.S. Pat. No. 4,143,355 to MacIntyre to permit relaxation of the requirement of constant document velocity. The document is manually conveyed through a defined slotted path so that the characters are scanned by a magnetic read head. The slotted path is established by a pair of substantially parallel (preferably vertical) track members and a bottom wall which is joined to, and separates, the track members by a dimension sufficient to laterally support the document, yet permits it to be conveyed along the path without substantial drag being imparted. Actual document speed is measured during the read operation by an idler member which is freely journaled and thus is drivenly rotated in response to frictional engagement with the conveyed document. The reader is capable of accurately reading the characters from the document regardless of the direction the document is moved past the read head. The compactness, low cost, high accuracy and versatility of the reader make it ideal for use in applications where a MICR reader has in the past been impractical—such as in point of sale and bank teller terminals.

23 Claims, 27 Drawing Sheets

OTHER PUBLICATIONS

Hewlett Packard, "Two Channel Optical Incremental Encoder Module", HEDS-9000 Series, pp. 4-7 thru 4-10.

"Wand reads numbers as it moves across page", Reprinted from May 1976 issue of Product Engineering, Morgan-Grampian Publishing Compnay.

IEEE Spectrum, vol. 13, No. 6, articles *Product Engineering*, May 1976.

*Digital Design*, vol. 6, No. 10, Oct. 1976, articles Product brochure entitled: "MICR-MATE I", Checkmate Electronics, Inc.

Mutual Non-Confidentiality Agreement, assignee of subject application and NCR Corporation, Oct. 23, 1986.

"Tenth Annual Check Processing Conference 1987", Bank Administration Institute Apr. 5-8, 1987, Nashville, Tennessee.

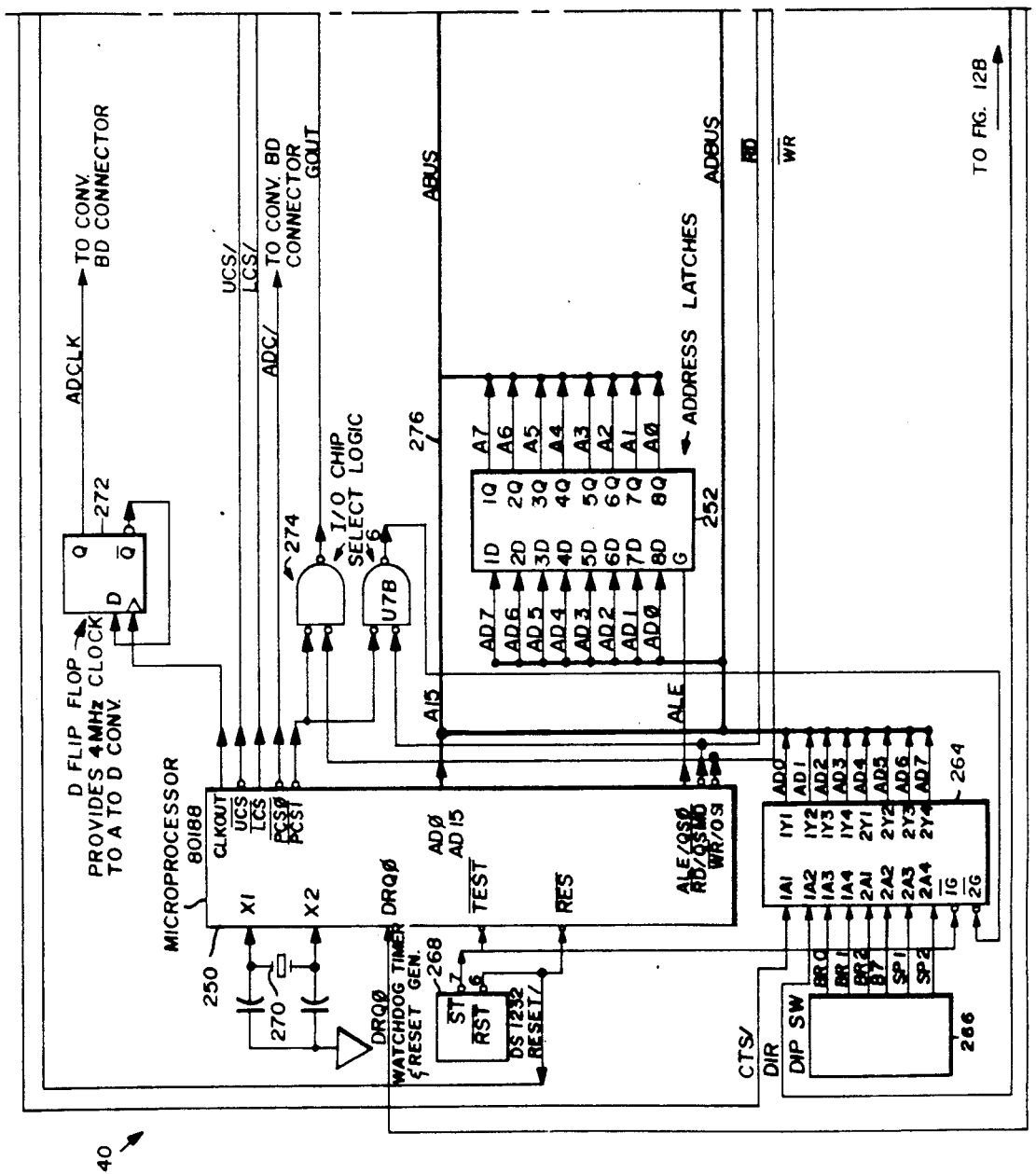

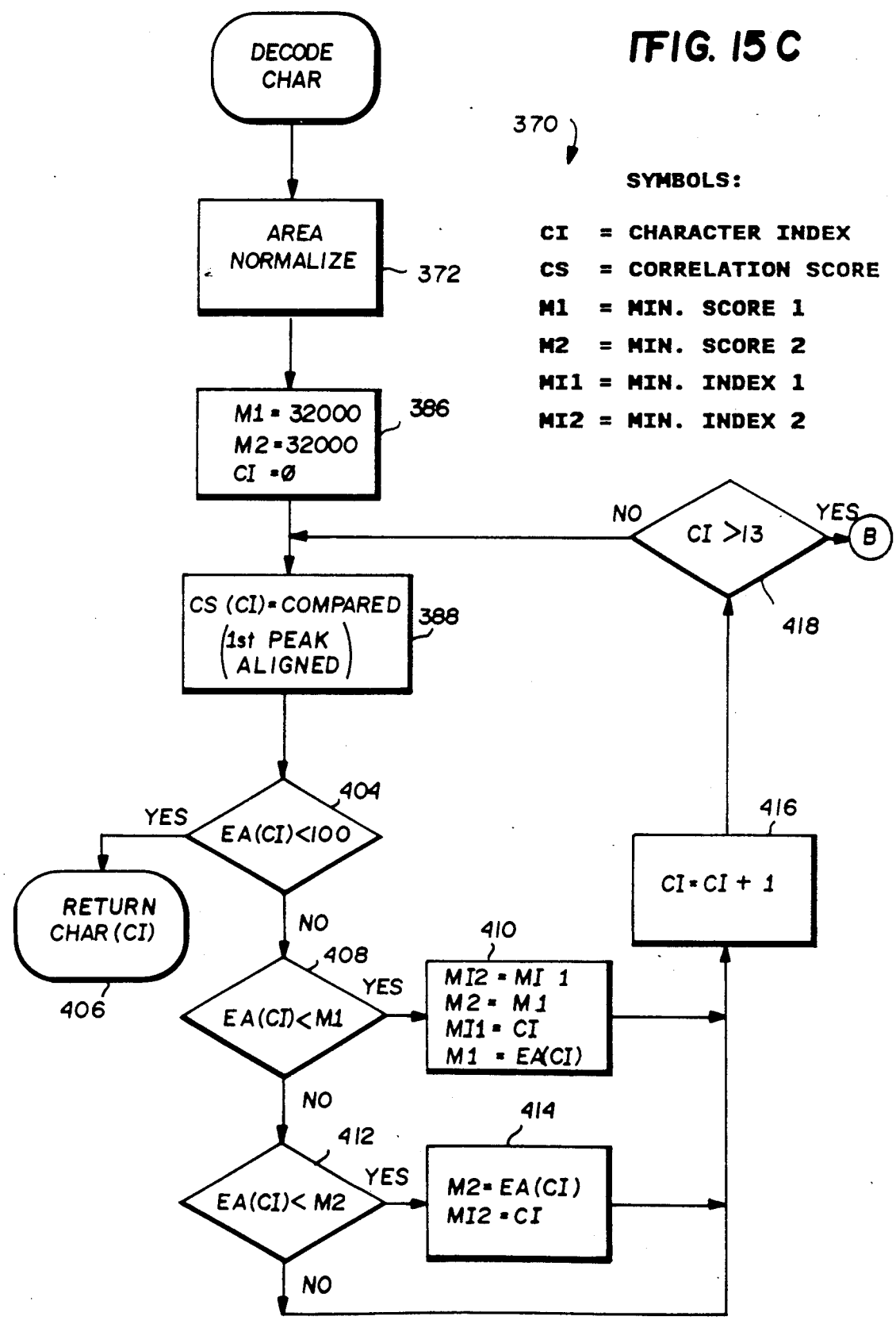

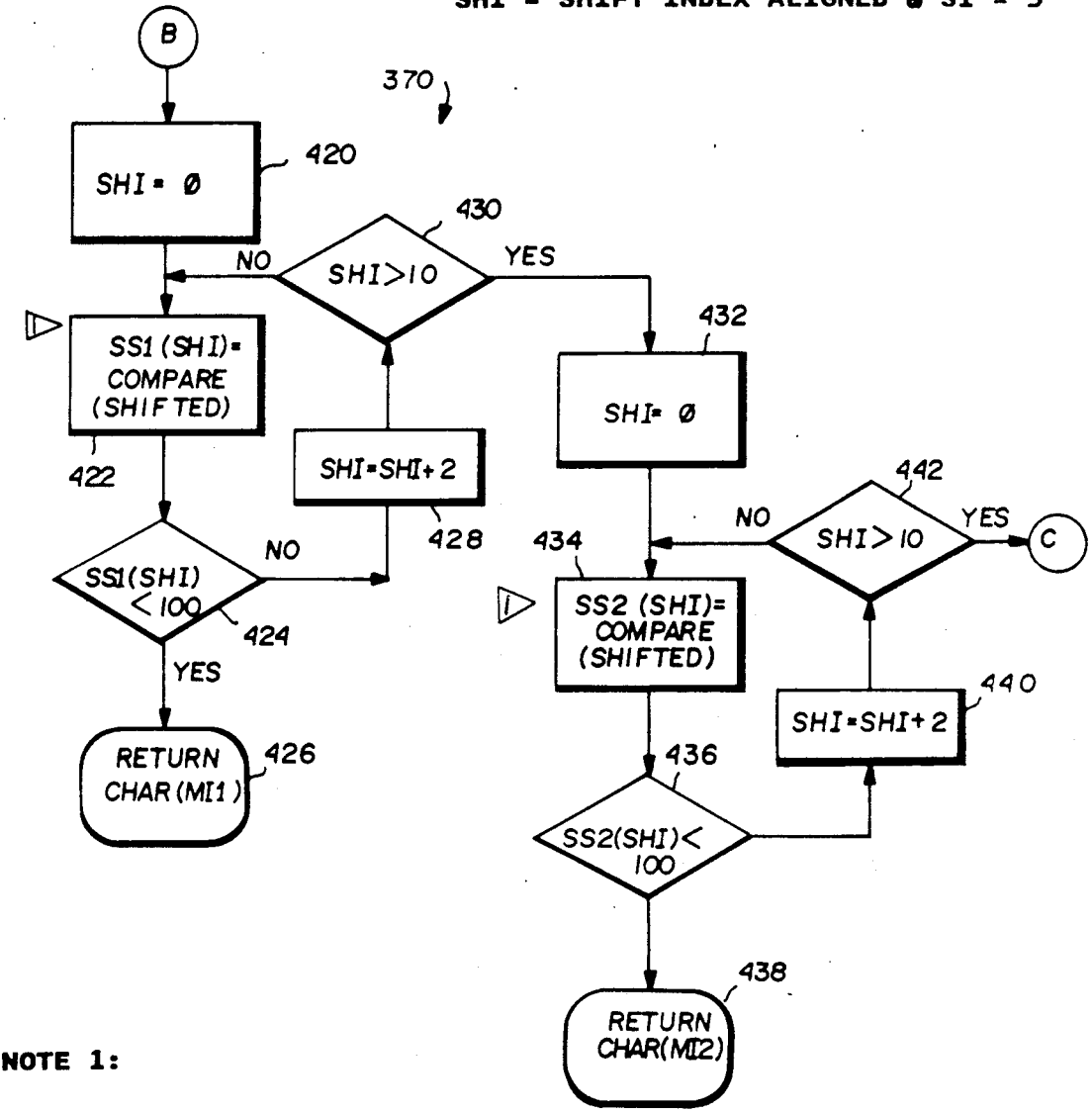

SYMBOLS:
- S = SAMPLE
- TP.H = POSITIVE THRESHOLD LEVEL
- TP.L = NEGATIVE THRESHOLD LEVEL
- NF = NORMALIZATION FACTOR
- TPA =
- FPI = INDEX OF FIRST PEAK

| /* PEAK NUMBER | 1 | 2 | 3 | 4 | 5 | 6 | 7 | 8 */ |
|---|---|---|---|---|---|---|---|---|
| /* ZERO   */ | 130, | -110, | 0, | 0, | 0, | 0, | 110, | -130, |
| /* ONE    */ | 65,  | 0,    | 85, | -50, | -90, | 0, | 0, | 0, |
| /* TWO    */ | 105, | -50,  | 0,  | 50,  | -105, | 0, | 0, | 0, |
| /* THREE  */ | 85,  | 85,   | -105, | 0, | 0, | -45, | 0, | 0, |
| /* FOUR   */ | 65,  | 0,    | -45, | 0, | 105, | 0, | -120, | 0, |
| /* FIVE   */ | 105, | -50,  | 0, | 0, | 50, | -105, | 0, | 0, |
| /* SIX    */ | 75,  | -35,  | 45, | -23, | 0, | 105, | -165, | 0, |
| /* SEVEN  */ | 75,  | -35,  | 70, | -80, | 32, | -45, | 0, | 0, |
| /* EIGHT  */ | 85,  | 85,   | -105, | 0, | 0, | 105, | -85, | -85, |
| /* NINE   */ | 165, | -50,  | -62, | 0, | 0, | 50, | -85, | 0, |
| /* TRANSIT */ | 100, | 0, | 0, | -100, | 0, | 105, | 0, | -105, |
| /* AMOUNT */ | 70, | 0, | -70, | 75, | -75, | 70, | 0, | -70, |
| /* ONUS   */ | 62, | 0, | 0, | -62, | 100, | -100, | 100, | -100, |
| /* DASH   */ | 67, | -67, | 67, | 0, | -67, | 67, | 0, | -67); |

SYMBOLS: MP = MICR PEAK
AP = ALL PEAKS (TABLE ABOVE)
APP = ALL PEAKS POINTER

DC REQUIRED*PEAKS (14) STRUCTURE (PEAK (8) INTEGER) DATA(

| /* PEAK NUMBER | 1 | 2 | 3 | 4 | 5 | 6 | 7 | 8 | */ |
|---|---|---|---|---|---|---|---|---|---|
| /* ZERO    */ | 0, | -20, | 0, | 0, | 0, | 0, | 0, | 0, | |
| /* ONE     */ | 0, | 0, | 0, | -20, | -20, | 0, | 0, | 0, | |
| /* TWO     */ | 0, | -20, | 0, | 20, | 0, | 0, | 0, | 0, | |
| /* THREE   */ | 0, | 0, | 0, | 0, | 0, | 0, | 0, | 0, | |
| /* FOUR    */ | 0, | 0, | 0, | 0, | 0, | 0, | -20, | 0, | |
| /* FIVE    */ | 0, | -20, | 0, | 0, | 20, | -20, | 0, | 0, | |
| /* SIX     */ | 0, | 0 | 20, | 0, | 0, | 0, | 0, | 0, | |
| /* SEVEN   */ | 0, | 0, | 0, | -20, | 20, | -20, | 0, | 0, | |
| /* EIGHT   */ | 0, | 0, | 0, | 0, | 0, | 0, | 0, | -20, | |
| /* NINE    */ | 0, | 0, | -10, | 0, | 0, | 20, | -20, | 0, | |
| /* TRANSIT */ | 0, | 0, | 0, | 0, | 0, | 0, | 0, | 0, | |
| /* AMOUNT  */ | 0, | 0, | 0, | 0, | 0, | 0, | 0, | 0, | |
| /* ONUS    */ | 0, | 0, | 0, | 0, | 0, | 0, | 0, | 0, | |
| /* DASH    */ | 0, | 0, | 0, | 0, | 0, | 0, | 0, | 0); | |

SYMBOL: RP = REQUIRED PEAK TABLE (ABOVE)
RPP = POINTER INTO REQ. PEAK TABLE
MP = MICR PEAK

NOTE: SEE WAVEFORM DIAGRAM FOR MORE INFO ON REQUIRED PEAKS

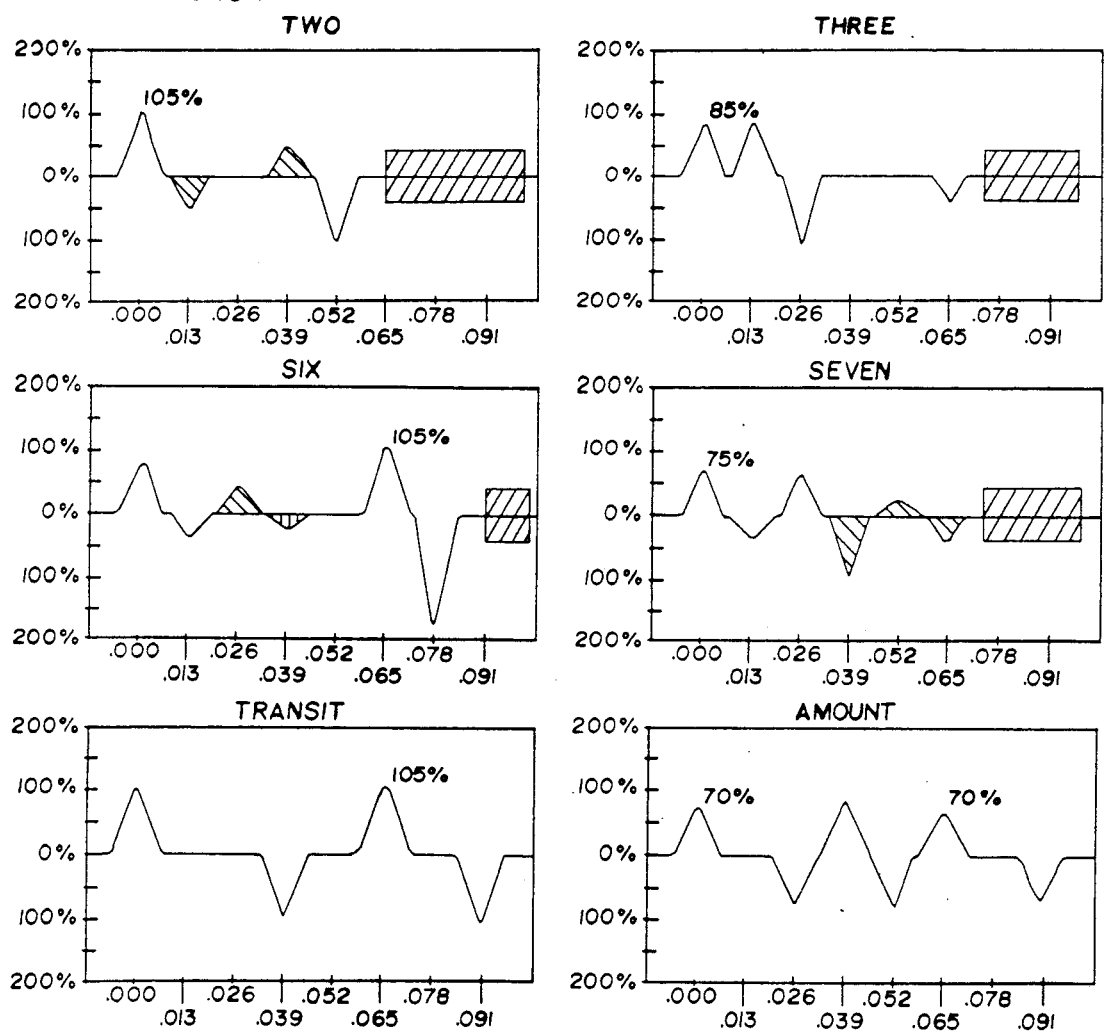

HAND-OPERATED LOW COST MAGNETIC CHARACTER RECOGNITION SYSTEM

CROSS REFERENCE TO RELATED APPLICATION

This application is a continuation-in-part of copending U.S. application Ser. No. 046,653 filed on May 5, 1987 and now abandoned, and copending U.S. application Ser. No. 046,654, filed on May 6, 1987 now abandoned, both in the name of John Randel LaCaze et al.

FIELD OF THE INVENTION

This invention relates to the field of magnetic ink character recognition (MICR). Specifically, the invention relates to waveform recognition type MICR systems which synchronize capture of signals produced by a magnetic read transducer with a pulsed timing signal generated in response to document movement relative to the read transducer. Still more particularly, the invention relates to hand operated devices which magnetically recognize MICR characters on a document (e.g., a bank check) during conveyance of the document, by hand, at variable velocity along a conveyance path first past a magnetizing station and then past a magnetic reading station.

BACKGROUND AND SUMMARY OF THE INVENTION

The banking industry has for many years imprinted magnetic ("MICR") characters upon documents (e.g., bank checks) so as to provide document-identifying information which can be visually read by humans and also automatically read by machine. The characters are printed on the document using magnetic ink (ink containing small magnetic particles) in an industry standard font configuration (specified, for example, by the latest revision of specification ANSI X3.2 entitled "American National Standard Print Specifications For Magnetic Ink Character Recognition" published by the American National Standards Institute, Inc. or by other MICR fonts, such as CMC-7). Briefly, for the E13-B font defined by ANSI specification X3.2, each "MICR" character is established by ink deposited in specified cells of a 7×9 matrix of discrete squares each 0.013 inches wide. The deposited ink pattern is visually recognizable by humans (e.g., as the numerals 0–9 or as special characters).

In addition, the amount of ink deposited in the various "columns" of the matrix is used by magnetic recognition systems to automatically identify the character. By first magnetizing these characters and then moving them past a magnetic read head, a waveform may be generated representing the rate of change of magnetic flux with time ($d\phi/dt$). The resulting electrical waveform indicates change in the amount of magnetic material beneath the read head as the medium bearing the characters moves past the head. Since the MICR character set is defined such that the combination of magnetic material amounts in the seven "columns" of a given character is unique, a corresponding unique waveform is developed for each character by the read head. The characters may be distinguished from one another (using appropriate recognition circuitry) by analyzing this resulting waveform.

Once the first part of a character passes the magnetic read head, it is important for the MICR recognition system to separately capture signals representing each of the following seven 0.013 inch long "segments" of the character—even though the position of the characters with respect to the document leading edge can (and typically does) vary from one document to another. This strict requirement has led others in the past to require the document to move past the read head at a fixed, constant and predetermined velocity—and to synchronize the recognition circuitry with a fixed frequency clock timing signal (e.g., produced according to the resonant frequency of a quartz crystal). While this solution is satisfactory for some applications, it requires an expensive and accurate mechanical document conveyance system (e.g., using a synchronous motor). The requirement of maintaining constant document velocity is, of course, impossible to meet in a hand-operated MICR recognition system.

Because of these (and perhaps other) problems, the conventional wisdom in the MICR field has been that a small, inexpensive and accurate manually operated magnetic check reader would be impossible to produce. Those recently designing inexpensive check readers have therefore used optical character recognition techniques. This approach has several disadvantages, however. One of the reasons banks initially adopted magnetic character recognition techniques is because magnetic reading of MICR characters is generally unaffected by folding, markings, and other mutilation of the document. Another reason is to help ensure check authenticity—because a photocopy of a check does not bear magnetic ink, the failure of a magnetic reader to recognize characters on it would indicate document inauthenticity. A magnetic character reader is in many cases capable of accurately reading characters which are incapable of being read optically, helps prevent the passing of "bad" checks, and has other advantages as well.

A particularly useful system which permits relaxation of the requirement of constant document velocity and also permits characters to be magnetically read with great accuracy is taught in U.S. Pat. No. 4,134,355, which issued to Robert M. MacIntyre on Mar. 6, 1978 and is commonly assigned with the subject application. MacIntyre's preferred embodiment derives a train of pulses from a timing means mechanically coupled to relative movement of the document with respect to the magnetic read head, and captures signals produced by the read head in response to pulses of the pulse train. MacIntyre's approach is quite significant—especially in view of the significant cost advantages provided by relaxing the constant document velocity requirement.

The present invention utilizes concepts disclosed in the MacIntyre patent to provide a low cost compact magnetic character recognition system which magnetically reads characters imprinted on documents as the documents are manually scanned by hand past a reading station (rather than having the documents automatically fed via driven rollers, vacuum belts or other like equivalent means). The present invention permits MICR systems to be employed cost effectively in many environments (e.g., at the point of sale and as part of bank teller terminals) which do not justify the expense (and/or cannot accommodate the size) of prior art magnetic check reading devices.

This advantage is obtained, according to the present invention, in a device which includes a slotted path sized and configured to accept the document as it is manually conveyed past a magnetizing station and a magnetic reading station. The slotted path is dimensioned so that a region of the document is exposed to permit it to be grasped by a user and manually conveyed past the magnetizing and reading stations.

An endless idler member having a friction surface is journally mounted such that at least a portion of the friction surface is substantially tangentially oriented relative to the slotted path. Means are provided in confronting relationship to the idler member which define a nip in the slotted path through which the document passes as it is conveyed and which urges the document into frictional engagement with the idler member's friction surface. This frictional engagement beneficially causes the idler member to rotate in response to relative movement between the document and the reading station.

An encoding disc is positively driven by the idler member rotation. Timing means associated with the encoding disc generates a pulse in synchronous response to document movement. These pulses time the collection of samples of the waveform produced by the reading station in order to identify characters on the document.

In accordance with another aspect of the invention, a MICR recognition circuit is provided which can accurately recognize the characters of a document regardless of the direction in which the document moves past the read head (e.g., right-to-left or left-to-right). Thus, a user need only orient the document so that the MICR characters pass by the read head—the direction the user moves the document past the read head being unimportant.

The preferred embodiment of the present invention can be economically incorporated into point of sale and many other types of systems. For example, each cash register in a retail store can be provided with a hand-operated check reader as well as a hand-operated credit card reader. Checks presented for payment can be automatically read and checking account numbers rapidly verified to provide the retailer with assurance that the check is "good". Electronic funds transfer (EFT) could even be used to debit the appropriate checking account—thereby reducing the volume of checks which flow through the payor bank.

Other aspects and advantages of this invention will become more clear after consideration is given to the detailed description of the preferred exemplary embodiments which follow.

BRIEF DESCRIPTION OF THE ACCOMPANYING DRAWINGS

Reference will be made to the accompanying drawings wherein like reference numerals throughout the various FIGURES denote like elements, and wherein:

FIGS. 12A-12C are together a schematic block diagram of the electronic MICR recognition circuitry of the preferred embodiment shown in FIG. 1;

FIGS. 16A-16B are representative idealized MICR waveforms showing waveform features used by MICR recognition circuitry to identify MICR characters.

DETAILED DESCRIPTION OF THE PREFERRED EXEMPLARY EMBODIMENTS

Figure 1:
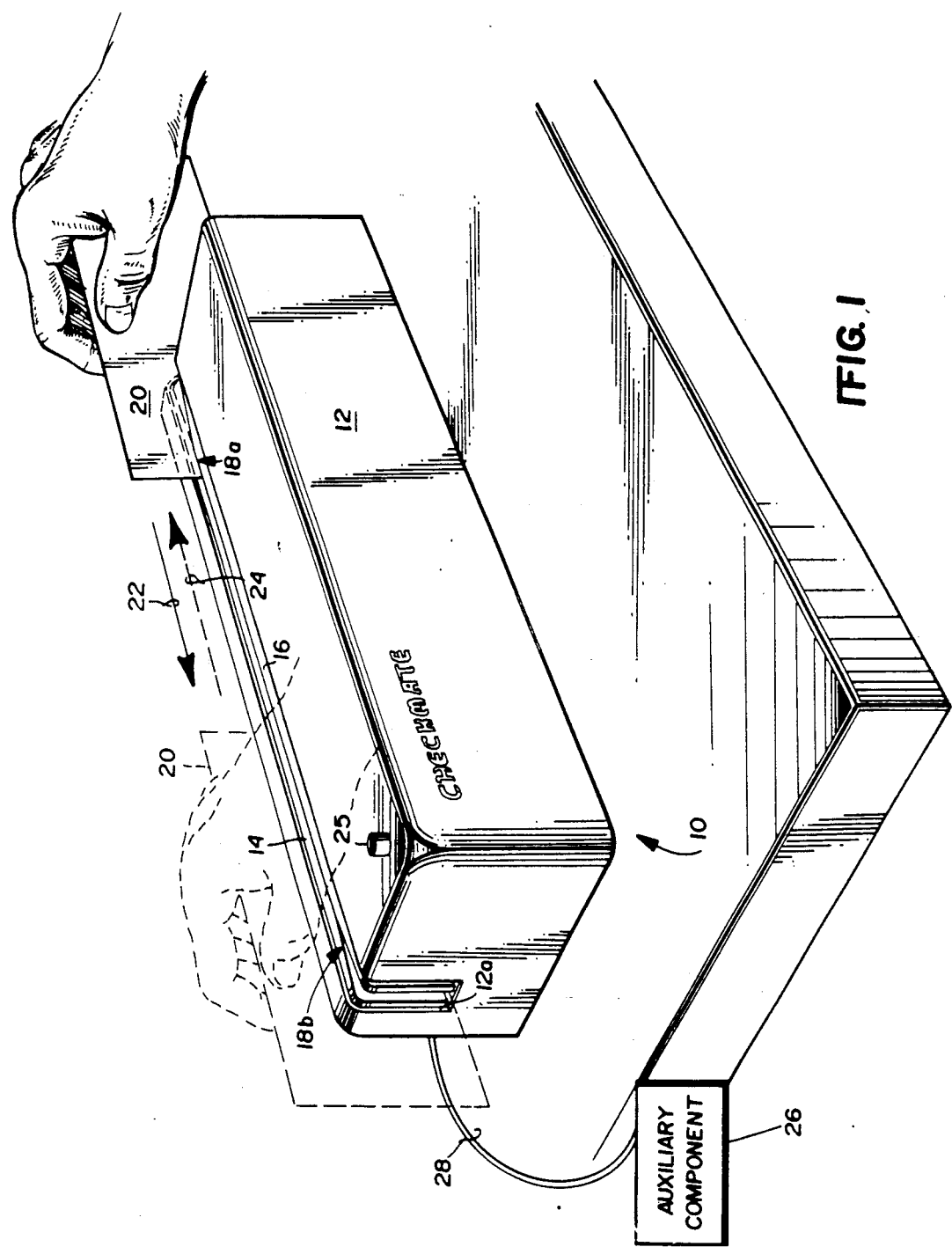
FIG. 1 is a front perspective view of a magnetic ink character recognition device embodying the present invention.

An exemplary embodiment of a hand-operated MICR reader 10 is shown in accompanying FIG. 1. Reader 10 includes a housing 12 which houses the internal mechanical and electrical components to be described later. The housing 12 defines a generally inverted U-shaped cut-out portion 12a which exposes a pair of elongate track members 14, 16 and thereby provides access to a linear slotted path 18 defined therebetween. The slotted path 18 is dimensioned to receive a document 20 bearing magnetic characters (not shown) and permits a user to manually convey the document 20 by hand from one end 18a of the slot to its other end 18b (i.e., in the direction as indicated by the arrow 22) during a "read" operation. Opposite directional movement through the slot 18 is also possible (i.e., in the direction as indicated by the arrow 24). The capability of the system 10 to recognize characters when the document 20 is conveyed in either of the directions indicated by arrows 22 or 24 will be described in greater detail later. Visual indication of character reading is provided by means of an LED 25. Illumination of LED 25 gives the user a "go/no-go" visual assurance that the characters on the document 20 have been successfully read.

Read information in the form of electrical digital data signals may be supplied to an auxiliary component 26 via suitable cabling 28. Component 26 may be, for example, a video monitor/keyboard or digital point of sale terminal which permits information obtained from the decoded document characters to be displayed in human-readable form and/or processed locally. The data obtained via reader 10 could also (or alternately) be supplied to a computer network for data storage/retrieval to allow for further processing and storage of the information (e.g., in conjunction with a transaction authorization/verification system similar to those currently in use for credit card transactions).

Figure 2:
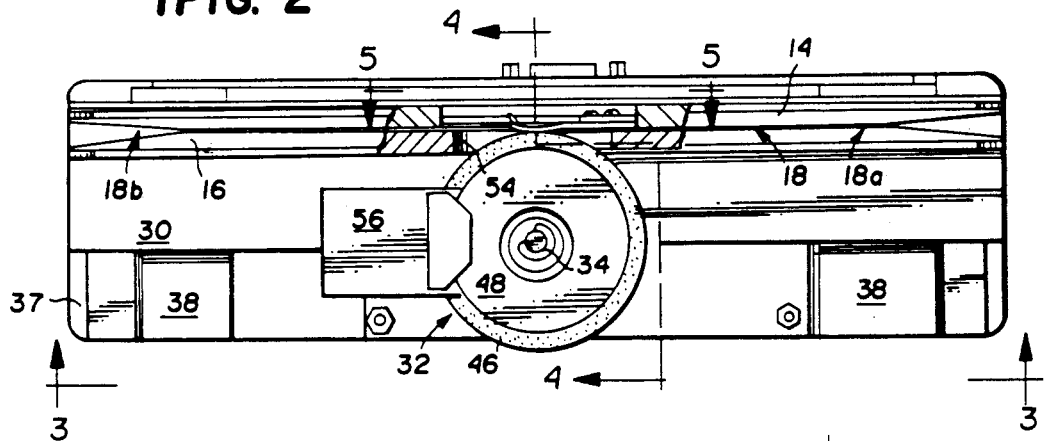
FIG. 2 is a top plan view of the internal structures associated with the device shown in FIG. 1.
Figure 5:
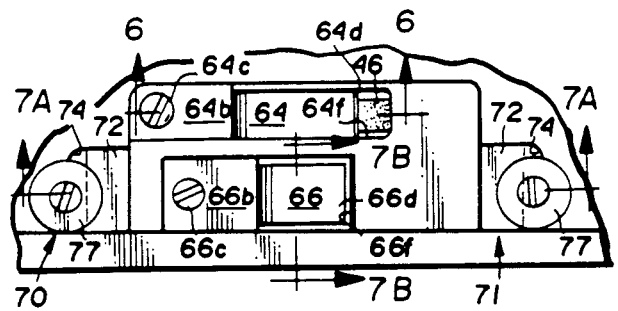
FIG. 5 is a partial rear elevation view taken along line 5—5 in FIG. 2.
Figure 4:
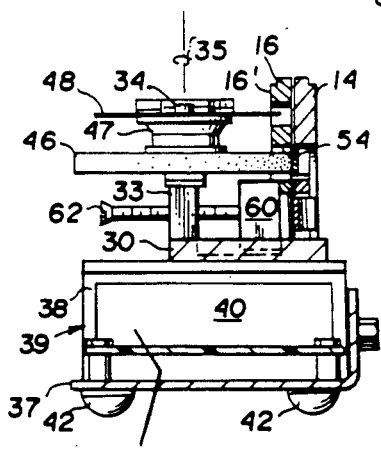
FIG. 4 is a cross-sectional elevation view particularly showing the idler member and the read head arrangement of this invention and taken along line 4—4 in FIG. 2.
Figure 7A:
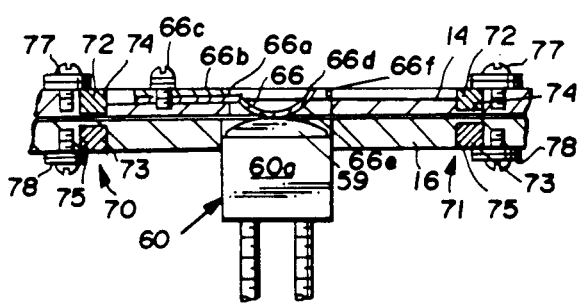
FIG. 7A is a partial bottom view of the read head employed in the present invention and taken along line 7A—7A in FIG. 5.
Figure 3:
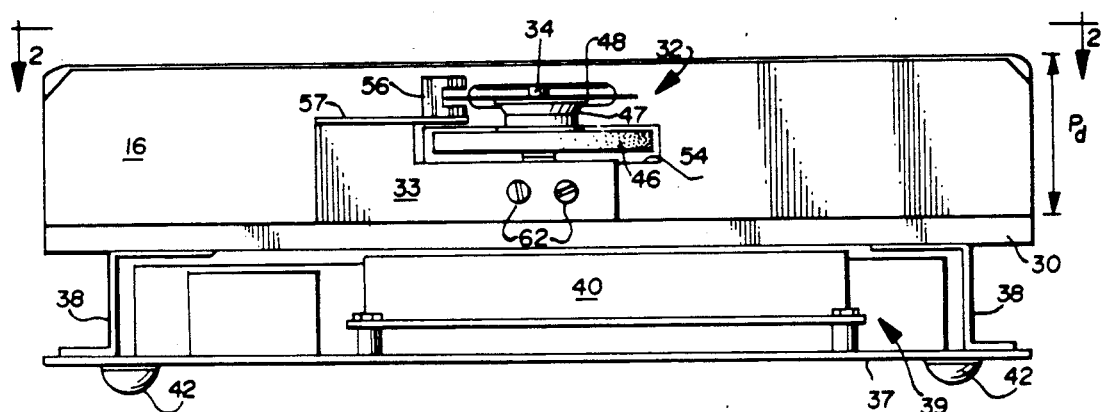
FIG. 3 is a front elevational view of the device shown in FIG. 1 as taken along line 3—3 in FIG. 2.

FIGS. 2–4 depict the reader 10 of the present invention in various views with the housing 12 removed to thereby more clearly illustrate the internal components. As can be seen, the track members 14, 16 are each rigidly coupled to a bottom support plate 30 which forms a bottom wall of the slotted path 18. An encoder assembly 32 is laterally offset relative to the track members 14, 16 and is journally mounted to shaft 34 of an upright support plate 33 (the latter being rigidly attached to bottom support plate 30) via suitable bearings (not shown) so that the encoder assembly 32 is capable of freely rotating about the vertical axis 35 (see FIG. 4) established by the shaft 34.

The bottom plate 30 (and thus also the structures mounted upon it) is supported in spaced relation to the bottom wall 37 by angle brackets 38 in the preferred embodiment. A space 39 is therefore established between the bottom wall 37 and bottom plate 30 so as to house various electronic components of the invention (for example, the character recognition circuitry 40 to be described later). The bottom wall 37 moreover includes dependent elastomeric feet 42 which frictionally grip the surface upon which reader 10 rests to thereby prevent its slippage during use.

Figure 6:
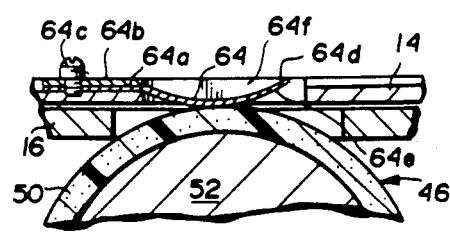
FIG. 6 is a partial bottom cross-sectional view of the idler member employed in the device of the present invention and taken along line 6—6 in FIG. 5.

The encoder assembly 32 includes an idler wheel 46 and a code wheel 48 coaxially mounted to shaft 34 and rigidly coupled one to another via spacer 47 so as to allow their concurrent simultaneous rotation about the established axis 35. In this regard, suitable bearings (not shown) are provided in spacer 47, idler wheel 46 and/or code wheel 48 so as to journally mount these structures to shaft 34. The idler wheel 46 has its periphery defined by a friction material which, in the preferred embodiment, is a sleeve 50 of an elastomeric material bonded to the circumference of the wheel's internal support 52 (see FIG. 6). The wheel 46 is positioned such that its peripheral friction surface (i.e., the periphery of elastomer sleeve 50) is substantially tangentially oriented relative to the linear slotted path 18. To permit this tangential orientation of wheel 46, the track member 16 defines a window 54 so that a portion of wheel 46 extends through window 54 to the path 18. As explained in greater detail later, manual conveyance of the document 20 along the path 18 responsively drives the idler wheel 46 which, in turn, causes the code wheel 48 to simultaneously rotate about axis 35 due to their journaled mounting to shaft 34.

The code wheel 48 is of the optical type in the preferred embodiment and defines a plurality of radially extending, circumferentially spaced open slots (not shown) that divide the circumferential distance around the code wheel 48 into equal discrete segments. Although a variety of code wheel arrangements (e.g., magnetic or optical encoding disks) may be used, it is presently preferred to employ a code wheel commercially available from the Hewlett-Packard Company, Model No. S1000J. This code wheel has 1,024 slots equally circumferentially spaced on a two inch diameter wheel. Thus, as the code wheel 48 rotates about axis 35, the slots defined therethrough are sequentially presented to an optical sensing device 56 supported so as to be in operative association with code wheel 48 via cross-support member 57 (rigidly coupled to upright support plate 33). Sensing device 56 outputs electrical pulses to the character recognition circuitry 40, the rate of the pulses being determined by the instantaneous velocity at which the document travels through slot 18.

A magnetic read head 60 (see FIG. 4) of a known variety e.g., a Brush TM read head is provided for sensing the rate of change of magnetic flux as magnetized characters pass in scanning relationship to a magnetic gap disposed on its forward end 59. In the particular embodiment shown, the read head 60 is capable of sensing characters located in a specific area on the document 20 (e.g., in the so called "clear band" which runs longitudinally along the lower edge of the document) and formatted according to ANSI/ABA specifications for E-13B characters and location. Thus, the characters are typically imprinted a prescribed distance from the bottom edge of the document 20. The precise locations of the characters with respect to document edges may vary from one document to another.

As is shown more clearly in FIGS. 5-7A, a pair of resiliently biased pressure members 64, 66 are mounted in opposed juxtaposition with respect to the idler wheel 46 and the read head 60, respectively. Each of the pressure members 64 and 66 in the preferred embodiment is a leaf spring having one end 64a, 66a, coupled to track member 14 by means of retainer plates 64b, 66b and mounting screws 64c, 66c, respectively. The other, free ends 64d, 66d of pressure members 64 and 66 define smoothly convex surfaces 64e, 66e which extend through windows 64f, 66f defined in track member 14 and are thus pressed against the idler wheel 46 and read head 60, respectively (i.e., by virtue of the inherent biasing force provided by the members 64, 66).

The pressure members 64, 66 establish a respective nip with the code wheel 46 and read head 60 through which the document 20 passes as it is being conveyed along the slotted path 18. The members 64 and 66 thereby press the document 20 against the idler wheel 46 and the read head 60, respectively. This, in turn, causes the document 20 to frictionally engage the periphery of idler wheel 46 thereby rotating idler wheel 46 about its axis 35 and also causes the characters on the document 20 to be brought into scanning proximity with the read head 60. The pressure member 64, besides causing frictional engagement between the document 20 and the idler wheel 46, also serves as a brake to stop rotation of the idler wheel 36 after the document's trailing edge has passed. The bias force exerted by members 64 and 66 should, of course, not be of a magnitude which would impart unacceptably high drag to the document 20 being manually conveyed along the slotted path 18. Exemplary acceptable forces exerted upon the document 20 by means of members 64 and 66 may be in the range of about 1 to about 4 ounces.

Although the preferred exemplary embodiment of this invention utilizes leaf springs to urge the document into operative association with wheel 46 and read head 60, other equivalent structures which accomplish similar functions could also be employed. For example, freely journalled endless numbers (e.g., roller's wheels or the like) could be positioned opposite to wheel 46 and/or read head 60 so as to urge the document 20 into operative association with these structures. Other unitary and/or multiple component spring-force biasing structures may also be employed as those in the mechanical arts will appreciate.

In order to be read by the head 60, the characters appearing on the document 20 must first be magnetized (since they typically are not already present on the document in a magnetized state). This is most conveniently accomplished by providing magnetizing stations 70, 71 laterally of the read head 60 along the slotted path 18 (see FIG. 7A). Each of the magnetizing stations 70, 71 is preferably comprised of paired, like-poled permanent magnets 72, 73 positioned in recesses 74, 75 formed in the track members 14 and 16. The magnets 72, 73 are respectively positionally maintained by means of screw/washer retainers 77, 78. The magnets 72, 73 are of the type which comply with paragraph 11.5.1.2 of ANSI specification X3.2 previously referenced. That is, magnets 72, 73 magnetize the magnetic ink characters on the document 20 to saturation in a direction parallel to the bottom reference edge of document 20 and in the plane of the characters (i.e., in the plane of the document 20, and hence, the plane of the slotted path 18).

It should be noted that, if the document 20 is manually conveyed along path 18 in the direction of arrow 22 (see, FIG. 1), the characters on the document 20 will first encounter the magnetic field provided by magnetizing station 70 (and the magnetic ink on the document will be magnetized by this field) before the characters are presented to the read head 60. Conversely, if the document 20 is manually conveyed along path 18 in the direction of arrow 24 (see FIG. 1), then the characters on the document 20 are magnetized via the magnetic field provided by magnetizing station 71. In either case, the other one of the magnetizing stations 70 or 71 does not affect the magnetization and reading of the characters on the document 20 since each of the stations 70 and 71 is spaced a sufficient distance away from one another and from read head 60 to prevent stray fields from affecting the magnetizing and reading process. Other forms of magnetic field generating means may be employed rather than the permanent magnet pairs 72 and 73 described above (provided that the functions noted by the ANSI specification referenced above are accomplished). For example, an electromagnetic device (e.g., a write head) could be used if desired, although from a cost point of view the use of permanent magnets is presently preferred.

Figure 7B:
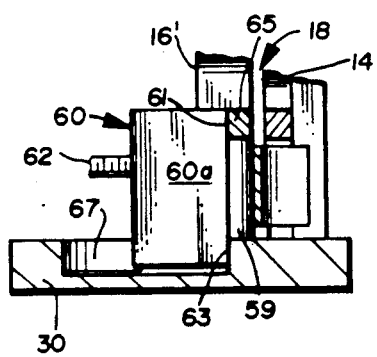
FIG. 7B is a cross-sectional elevation view showing the mounting of the read head as taken along line 7B—7B in FIG. 5.

As is shown more clearly in FIG. 7B, the read head 60 is supported relative to the path 18 so that the read head's forward end 59 is substantially tangentially oriented relative to the slotted path 18 and is aligned with the characters appearing on the document 20 to be scanned—that is, so that the read head 60 is capable of scanning (and responding to) the characters as they pass during the document's conveyance along the slotted path 18. In the preferred embodiment, the read head 60 is structurally supported against reference surfaces 61, 63 respectively provided by cross-member 65 and the forward edge (i.e., relative to slot 18) of recess 67 defined in bottom plate 30. The vertical spacing between surfaces 61 and 63 and the dimension that each is recessed relative to the exterior vertical planar surface 161 of track member 16 is such that the forward surface of the read head's case 60a bears against the surfaces 61 and 63 so that the forward end 59 of head 60 protrudes towards slot 18, the forward end being substantially tangentially aligned with slot 18. Thus, no lateral adjustment of the head 60 towards or away from slot 18 is necessary (although lateral adjustment of head 60 could be provided by suitable guide structures, carriage means or the like (if desired). The head 60 is held in pressing engagement with surfaces 61, 63 by means of mounting screws 62 threadably engaged with upright support plate 33 (see FIG. 4).

Figure 8:
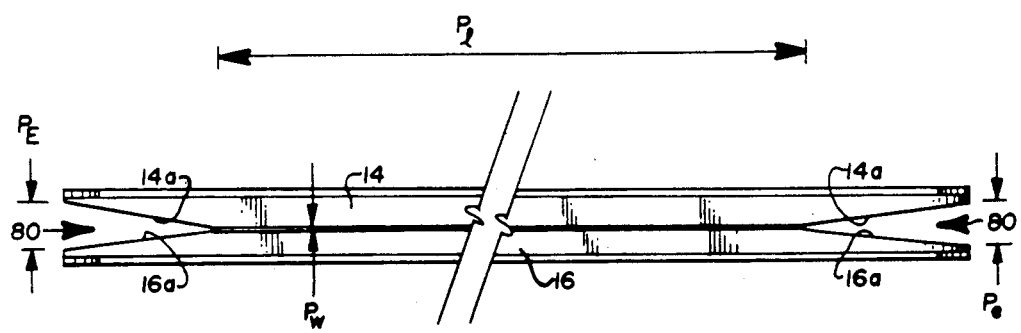
FIG. 8 is a detailed plan view of the linear conveyance path established by the track members of this invention.

As already mentioned, the slotted path 18 is one important feature of this invention since its dimensions must not only permit the document 20 to be easily manually conveyed therethrough without substantial drag being imparted, but also the document must be prevented from collapsing along its length when it encounters the nips defined between the pressure members 64, 66 and the idler wheel 46, read head 60, respectively. To this end, the track members 14 and 16 define an opposed pair of vertically planar parallel surfaces separated by a dimension $P_w$ as shown in FIG. 8 that collectively provide lateral support for document 20 as it is conveyed through slot 18. That is, dimension $P_w$ is such that, when the leading edge of document 20 first encounters the nip between members 64, 66 and idler wheel 46, read head 60, respectively, sufficient lateral support is provided by means the opposing planar surfaces of track members 14, 16 to resist the tendency of document 20 to fold onto itself in an accordian-type fashion. This lateral support provided by the track members 14, 16 thus maintains document 20 in a vertically planar state and serves to "rigidify" the document 20 during its manual conveyance through slot 18 thereby allowing it to overcome the bias force of pressure members 64, 66 and pass through the nips which they establish with idler wheel 46 and read head 60, respectively.

Exemplary dimensions for path 18 include a minimum path length (dimension $P_L$ in FIG. 8) of about 3.00 inches (i.e., about 1.50 inches on either side of the read head 60 at which location the magnetizing stations 70, 71 are positioned), a path width dimension $P_w$ of between about 0.010 to about 0.060 inch, and a path depth dimension $P_d$ of between about 0.750 inch to about 2.00 inches.

It will also be observed from FIG. 8 that each end of the slotted path 18 terminates in a V-shaped guideway 80. These guideways 80 are conveniently defined by an opposing pair of surfaces 14a and 16a, of track members 14, 16, respectively. Surface pairs 14a and 16a converge toward the slotted path 18 defined between the members 14 and 16 to thereby form the V-shaped guides 80 which thus serve to assist the user in guiding the document 20 into the slotted path 18. Since the dimension $P_e$ of the V-shaped guides 80 is significantly greater as compared to the width dimension $P_w$ of the path 18, the hand feeding of documents into the more narrow path 18 is facilitated.

Figure 10:
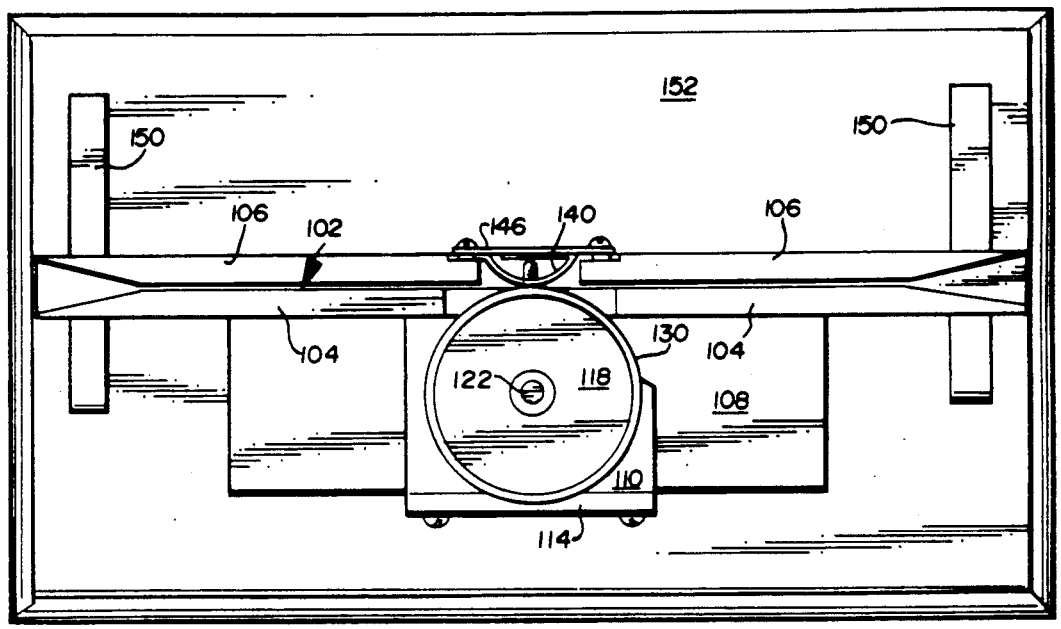
FIG. 10 is a top plan view of the device shown in FIG. 9.
Figure 9:
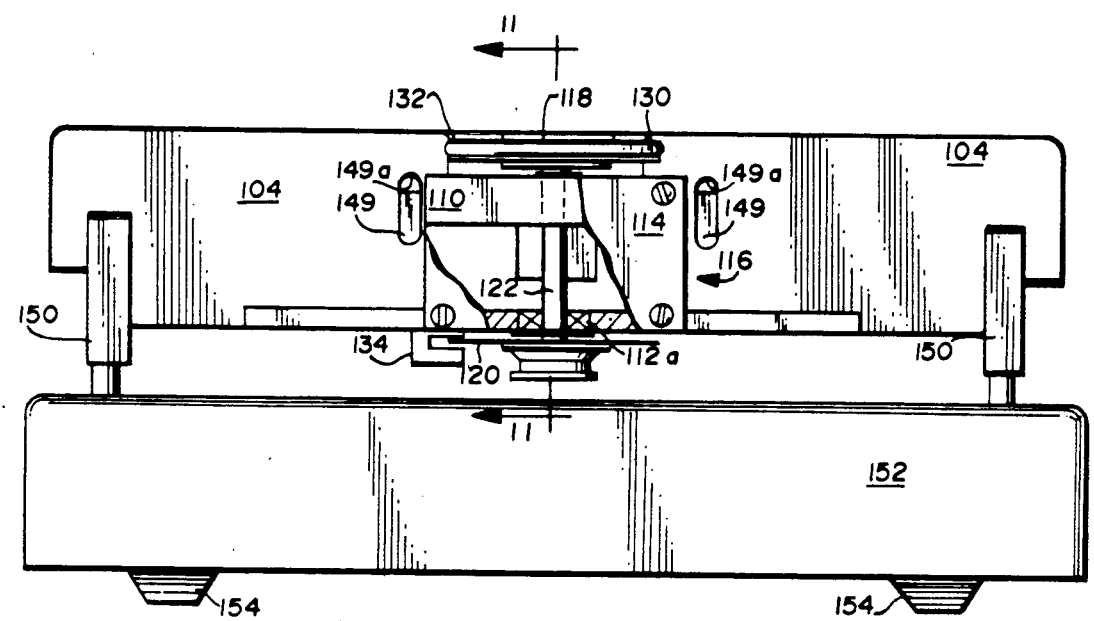
FIG. 9 is a front elevation view of another embodiment according to this invention.
Figure 11:
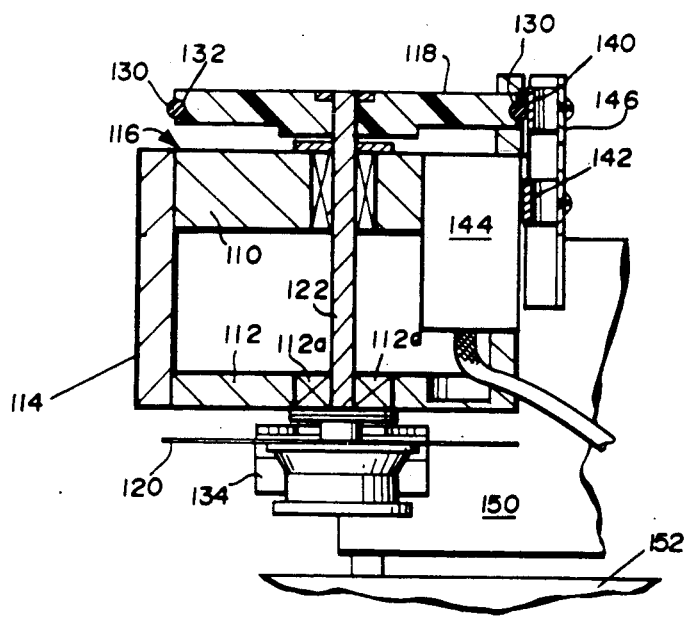
FIG. 11 is a cross-sectional view of the FIG. 9 device as taken along line 11—11 therein.

Another embodiment of a reader 100 according to this invention is shown in accompanying FIGS. 9–11. It will be seen that the document guide path 102 in this embodiment of the reader is defined by means of a pair of front track plates 104 which are mirror images of each other, and a pair of rear track plates 106 which are also mirror images of each other. The track plates 104 and 106 are held apart by a track bottom plate 108 so as to define the upwardly opening guide path 102 therebetween bounded by the plates 104 and 106. The track plates 104 and 106 are also held in position by a top bearing plate 110 and a bottom bearing plate 112, the rear edges of each being rigidly coupled to a rear support plate 114. The bearing plates 110 and 112 each define respective bearing holes 110a and 112a, respectively, oriented along the vertical centerline of the path 102 and laterally spaced therefrom a prescribed dimension so as to accommodate the encoder assembly 116.

The idler and code wheels 118 and 120, respectively, of assembly 116 are rigidly coaxially mounted to shaft 122. Shaft 122 is, in turn journally mounted to the bearing plates 110, 112 by suitable bearings 124, 126, respectively received in bearing holes 110a, 112a, so that the idler and code wheels 118 and 120 are capable of concurrent simultaneous rotation with shaft 122. The idler wheel 118 is thus rotatably coaxially mounted above the bearing plate 110. In the form shown, the idler wheel 118 has a resilient gripping member 130 (e.g., an elastomeric O-ring) received in an annular peripheral groove 132 of the wheel 118. The outside diameter of the resilient gripping member 130 is such that the peripheral edge tangentially projects into the path 62 so that a document conveyed therealong will frictionally engage it and thus drive the wheel 118. This tangential orientation of wheel 118 is permitted by virtue of track plates 104 being spaced apart in the direction of path 102.

The code wheel 120 is mounted below the idler wheel 118 and below bearing plate 112 as is best seen in FIGS. 9 and 11. Like the embodiment of the system 10 described above with reference to FIGS. 1-8, the code wheel 120 includes a plurality of radially extending, circumferentially spaced openings the passage of which is detected by an optical sensor 134 when the code wheel 120 rotates in response to document conveyance along path 102 (i.e., in synchronous response to rotation of idler wheel 118) to thereby generate a timing signal correlated to the instantaneous speed of conveyance of the document along the path 102.

A pair of pressure members 140, 142 are provided in opposing juxtaposition with respect to idler wheel 118 and the read head 144, respectively, for the purposes already discussed above. Pressure members 140, 144 are positionally maintained relative to the idler wheel 118 and the read head 144, respectively, via a mounting plate 146 which bridges the gap between the spaced-apart track plates 106. Opposing pairs of permanent magnets 149 are received in respective recesses 149a defined in track plates 104, 106 (only magnets 149 in recesses 149a of track plate 104 being visible in FIG. 10, but magnets 149 in recesses 149a of track plate 106 being a mirror image thereof) so as to magnetize the magnetic characters on the document 20 before they are scanned by the read head 144 as was discussed above with reference to the reader 10 of FIGS. 1-8.

A pair of spaced-apart upright supports 150 rigidly mounts the structures described above to a base 152 which houses the character recognition circuitry 40. Elastomeric mounting feet 154 are also provided on the bottom of base 152 to prevent its slippage along a surface supporting the reader 100 during use.

Figure 12B:
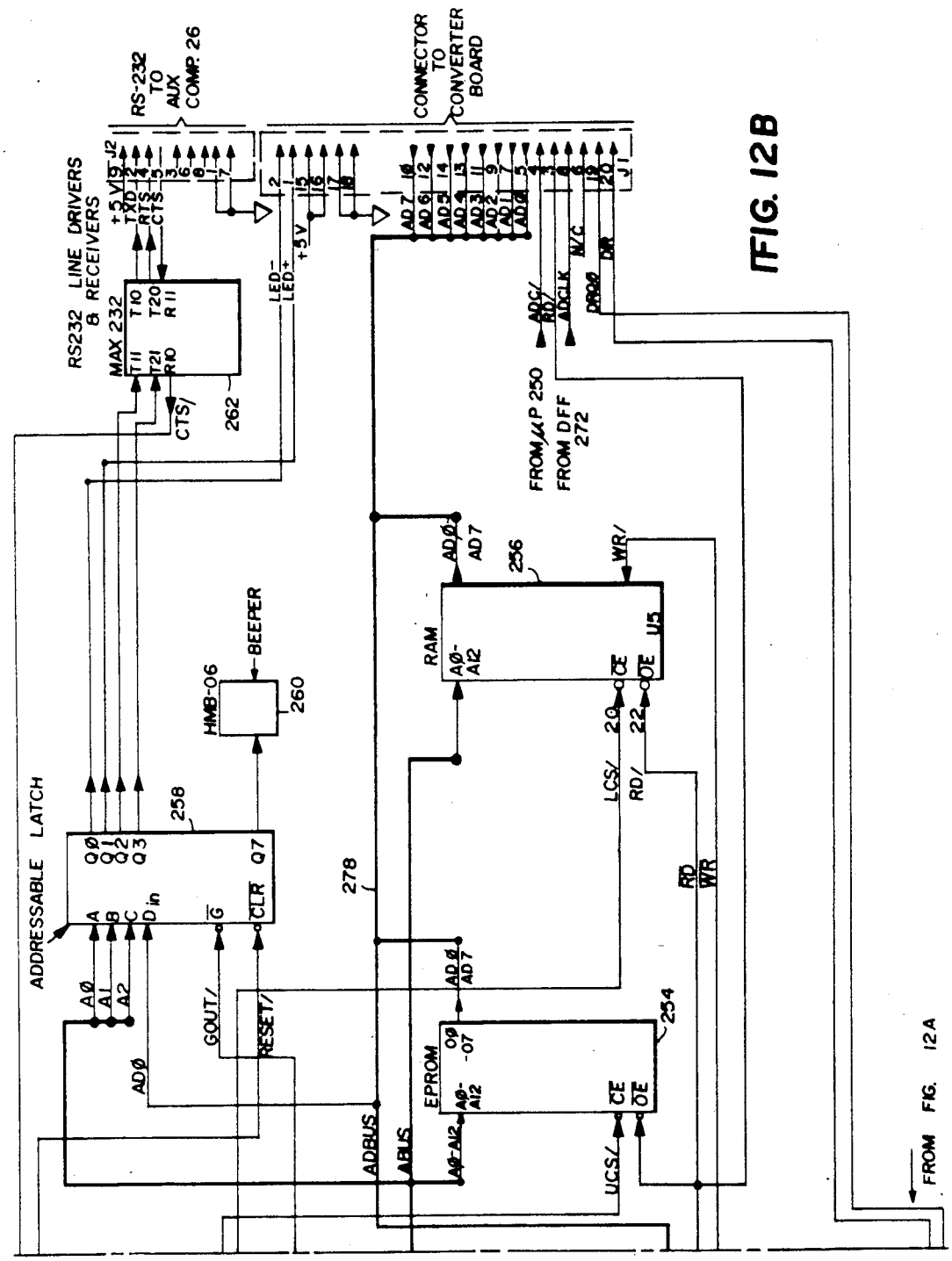
Figure 12C:
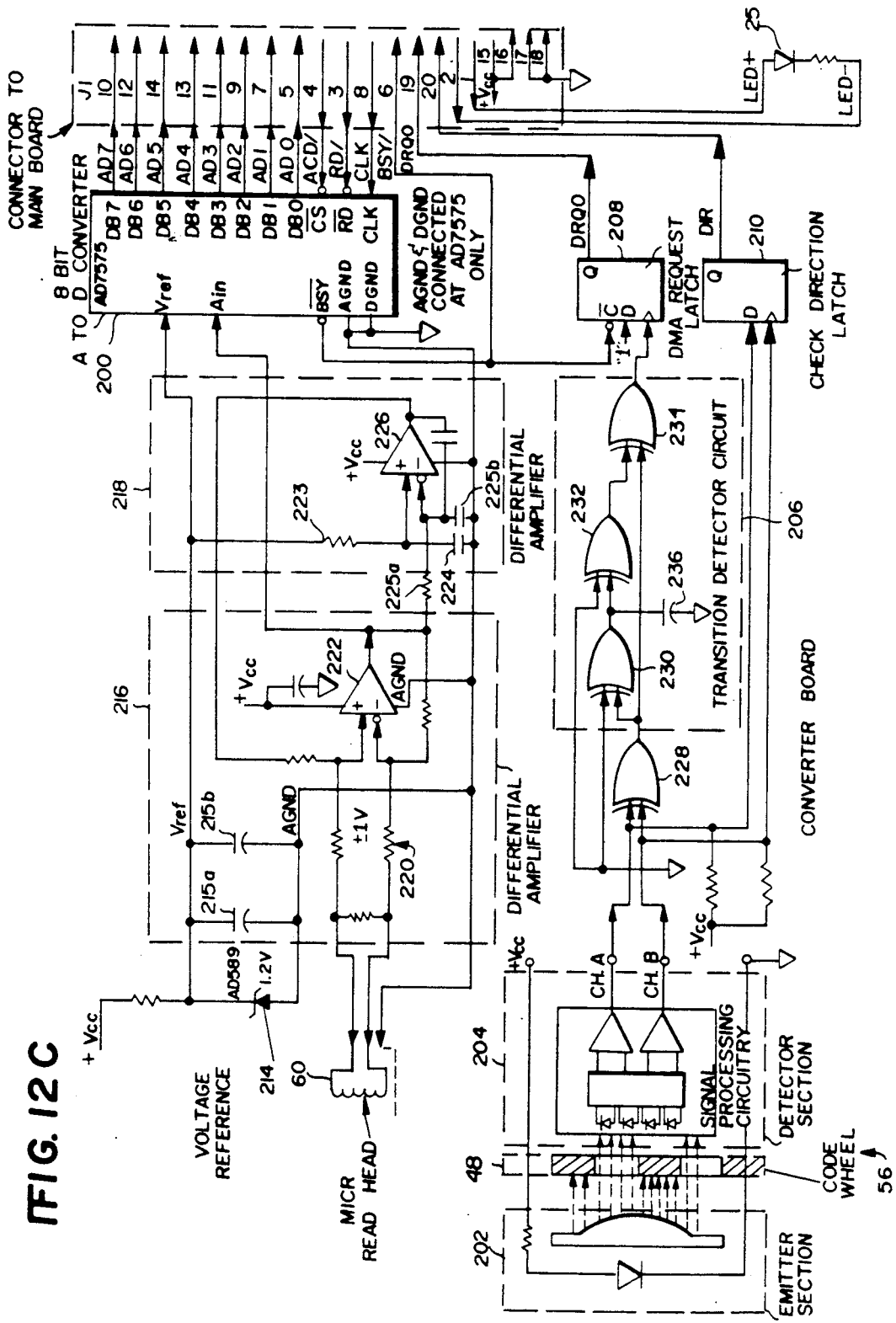

FIGS. 12A-12C together are a detailed schematic diagram of MICR recognition circuitry 40 of the preferred embodiment. In the preferred embodiment, circuitry 40 is placed on two different printed circuit boards, a "main board" (this circuitry is shown in FIGS. 12A and 12B), and a "converter" board (this circuitry is depicted in FIG. 12C). A connector J1 permits signals to pass between the main board and the converter board.

Referring now more particularly to FIG. 12C, the converter board includes an analog-to-digital ("A/D") converter 200, a light source 202, code wheel 48, light detector and associated signal processing circuitry 204, transition detector circuitry 206, DMA request latch 208, a check direction latch 210, light-emitting diode (LED) indicator 25, a voltage reference source 214, a differential amplifier 216, and a voltage follower amplifier 218.

MICR read head 60 is connected across a conventional balanced impedance matching resistance network 220 to the inverting and non-inverting inputs of a differential operational amplifier (op amp) 222. Op amp 222 and associated capacitors and resistors sense the current flowing through read head 60 and convert this current flow to a proportional voltage (waveform). The voltage swing in the electrical waveform produced by op amp 222 in response to the changing read head current is about 2 volts peak-to-peak. This voltage swing is normally centered about 0 volts (and thus has positive excursions ranging between 0 volts and about +1 volt as well as negative excursions ranging between 0 volts and about −1 volt). Reference voltage source 214 and associated amplifier stage 218 superimposes this electrical waveform on a constant DC component, as will be explained.

Voltage reference source zener diode 214 (part number AD589 in the preferred embodiment) is connected between a positive supply voltage and ground, and produces a 1.2 VDC constant reference voltage $V_{ref}$ which after filtering by capacitors 215a, 215b is applied to the $V_{ref}$ input of A/D converter 200. The reference voltage is also connected through a series resistor 223 to the non-inverting input of a further op amp 226 (part of stage 218). A capacitor 224 connected between the op amp 226 non-inverting input and ground in conjunction with a resistor 223 provide low-pass filtering and thus filter out any variations in the reference voltage to provide a constant DC component to the op amp 226 non-inverting input.

The output of op amp 222 is connected through a series resistor 225a (and shunt capacitor 225b) to the inverting input of op amp 226, the resistor and capacitor forming another low-pass filter network. Resistor 225a and resistor 223 have equal values in the preferred embodiment (100 kilohms), and capacitors 224, 225b also have equal values (6.8 microfarads in the preferred embodiment). Thus, resistor-capacitor network 223, 224 and resistor-capacitor network 225a, 225b provide balanced low-pass filtered inputs to op amp 226. Resistor 225a and capacitor 225b filter from the output of op amp 222 all but the DC component and present that component to the inverting input of op amp 226.

Op amp 226 and associated components produce a voltage output which is nominally at the level of reference voltage $V_{ref}$. This voltage output is applied to the non-inverting input of op amp 222, as mentioned previously. The output of op amp 222 includes a constant DC component $V_{ref}$ superimposed on which is a time-varying signal component responsive to the current flowing through read head 60. This time-varying signal component in the preferred embodiment has both positive and negative excursions and, in particular, ranges between −1 V and +1 V. The reference voltage $V_{ref}$ in the preferred embodiment has an amplitude of 1.2 V, so that the output of op amp 222 is guaranteed to be positive with a center voltage of about 1.2 VDC (although the instantaneous value of the output signal will depend upon the change in magnetic flux the read head 60 senses).

Op amp 222 thus superimposes the read head signal onto a constant DC level. When the output of op amp 222 falls below the reference signal $V_{ref}$, a negative excursion of the read head signal is present. Conversely, a positive excursion of the read head signal responsive to a segment of a character passing the read head is indicated whenever the op amp 222 output increases above the reference level. The superposition is performed in the preferred embodiment in order to permit the use of an A/D converter which converts only positive signal levels. Of course, those skilled in the art understand that if an A/D converter which converts both positive and negative levels were used, the superposition would not be necessary.

Op amp 226 also senses the DC offset voltage output from op amp 222, compares this offset voltage with the reference voltage, and continuously adjusts its output level so as to maintain a proper DC offset at the output of op amp 222. This feedback mechanism prevents drift of the op amp 222 DC offset voltage from affecting the accuracy of reader 10. As another precaution to prevent analog signal drift, voltage reference source 214, op amp 222, op amp 226 and A/D converter 200 all use a common ground "AGND" which is tied to the ground potential used by the rest of MICR recognition circuit 40 only at the input pins of A/D converter 200. This grounding configuration prevents variations in the signal presented to the A/D converter $A_{IN}$ input resulting from stray grounding effects, spurious signal pickup, and the like.

The output of op amp 222 is connected to the $A_{IN}$ ("analog in") signal input terminal of A/D converter 200. A/D converter 200 in the preferred embodiment is a conventional off-the-shelf 8-bit analog-to-digital converter (part number AD7575). A/D converter 200 is clocked by a 4 MHz clock signal applied to pin 8 of connector J1. A/D converter 200 converts (at the request of microprocessor 200) the analog signal applied to its $A_{IN}$ input to an 8-bit digital value available at converter parallel digital data outputs DB7-DB0 (these outputs are connected to the main board via J1).

A/D converter 200 is selectively addressed by the signal ACD produced by the main board (which in the preferred embodiment is applied to the "chip select" pin of the converter) to selectively enable the converted digital data onto the converter output pins—and to begin the next sample conversion. A/D converts a sample in about 5 microseconds or so. A/D converter 200 produces a signal "BSY" while it is busy converting a sample. This "BSY" signal asynchronously clears DMA request latch 208 at the beginning of each new sampling by A/D converter 200. DMA request latch 208 is set in response to signals produced by light detector and associated circuitry 204, 206. Microprocessor 200 responds to the setting of latch 208 by reading the digital data generated by A/D converter 250 and requesting the converter to convert a new sample. The manner in which latch 208 is set in the preferred embodiment will now be explained.

In the preferred embodiment, optical sensing device 56 includes an HEDS-9000 series two channel optical incremental encoding module commercially available from the Hewlett-Packard Corporation. This encoder module is specifically designed to operate in conjunction with the optical encoding disc 48, and includes a light source and associated collimating lens 202, and light detectors and signal processing circuitry 204 all within a single integrated package. As code wheel 48 rotates, a light beam produced by a LED light source 202 (internal to the encoding module) is interrupted by the code wheel slots. Photodiodes detecting those interruptions produce electrical outputs which are fed through internal signal processing circuitry 204. The encoding module produces two digital signal output channels A and B (with the digital output of channel A in quadrature—that is, 90 degrees out of phase—with the digital output of channel B). Specifications published by the Hewlett-Packard Company describe this conventional encoding module in much greater detail.

In the preferred embodiment, the channel A and B digital signal outputs of light detector circuitry 204 are connected to the inputs of a two-input exclusive-OR (XOR) gate 228. As is well known, XOR gate 228 produces a logic level 1 signal only when its input signals have different states. Accordingly, XOR gate 228 effectively multiplies the pulse rate of, for example, channel A by a factor of 2 to produce a periodic output signal which has double the pulse rate of either of the two input signals (change is A and B). The output of XOR gate 228 is applied to a simple transition detector circuit 206 including three XOR gates 230, 232, 234 and a capacitor 236. Transition detector circuit 206 produces a short pulse (the pulse duration being determined in part by the characteristics of XOR gate 230 and in part by the capacitance of capacitor 236) whenever the output of XOR gate 228 changes state. The output of transition detector circuit 206 is connected to the clock input of DMA request latch 208. Because the D input of latch 208 is tied to logic level 1, the latch sets whenever transition detector circuit 206 produces a pulse, and is subsequently asynchronously reset the next time A/D converter 200 begins converting a sample. As will be understood, the time it takes A/D converter 200 to convert a sample (about 5 microseconds in the preferred embodiment) is much less than the typical duration between successive pulses produced by transition detector circuit 206 (40 or 50 microseconds in the preferred embodiment)—even when the document is moved very rapidly through reader 10 (e.g., at 50 ips or more).

Reader 10 is capable of accurately reading the MICR characters imprinted on the document even while the document velocity varies over a wide range. Because the document is conveyed by hand in the preferred embodiment, the document velocity varies greatly—since it is not possible for a user to move the document at a velocity which even approximates a constant velocity. Although it is possible for one to move the document through reader 10 at velocities in excess of 100 ips (and the reader is capable of accurately recognizing characters on documents moved at these velocities), the maximum velocity most users can comfortably move a document through the reader is about 60 ips. As document velocity decreases, the output signal amplitude produced by read head 60 falls off. It is not possible for the preferred embodiment to accurately recognize characters on a document conveyed at a velocity below some minimum velocity determined by, for example, the sensitivity of read head 60 and the signal-to-noise ratio of op amp 222. In the preferred embodiment, this lower velocity limit is about 5 ips for "in spec" documents and about 8-10 ips for documents imprinted with low ink density.

The channel A and B outputs of light detector/circuitry 204 are also connected to inputs of check direction latch 210 in the preferred embodiment. In particular, the channel A output is connected to the D input of the latch 210, and the channel B output is connected to the clock input of the latch. Because of the quadrature relationship between the channel A and channel B outputs, the check direction latch 210 indicates the direction in which a document is moving through reader 10. If a document moves in a first direction, channel A will rise to logic level 1 before channel B follows to logic level 1—and check direction latch 210 is set. If the document is moving in the other direction, on the other hand, channel B rises to logic level 1 before channel A follows to logic level 1—and latch 210 is reset. In the preferred embodiment, the single bit "DIR" produced by latch 210 is used by microprocessor 250 to determine the direction in which a document moves through reader 10.

Referring now to FIGS. 12A and 12B, the main board of MICR recognition circuit 40 includes a microprocessor 250, an address latch 252, a read only memory 254, a random access memory 256, an addressable latch 258, a beeper 260, a line driver/receiver 262, a register 264 and associated DIP switches 266, a watchdog timer and reset generator 268, a crystal 270, a flip-flop divider 272, and an I/O chip select logic 274.

Microprocessor 250 in the preferred embodiment is a 80188 16-bit microprocessor driven at 16 MHz by quartz crystal 270. Microprocessor 250 communicates via a 16-bit address bus 276 with read only memory (ROM) 254 and random access memory (RAM) 256. ROM 254 stores program control instructions directing microprocessor 250 to perform prespecified steps. RAM 256 stores temporary data used by the microprocessor to perform calculations, and also buffers the data produced by A/D converter 200 (in the preferred embodiment, converter 200 is permitted to access RAM 256 directly using conventional direct memory access techniques).

In the preferred embodiment, an 8-bit multiplexed address/data bus 278 is used to communicate data between the microprocessor 250, register 264, ROM 254, RAM 256, and A/D converter 200. Thus, while microprocessor 250 supports a single 16-bit multiplexed address/data bus, the preferred embodiment uses address bus 276 to carry 16-bit memory addresses and address/data bus 278 to convey 8-bit data bytes between components. Addressing is typically performed directly via address bus 276, although some additional chip select logic external to microprocessor 250 is used in the preferred embodiment. For example, logic 274 (two OR gates in the preferred embodiment) responds to a signal "PCS1" produced at a microprocessor output port pin to select addressable latch 258 and/or register 264. Read and write control lines generated by microprocessor 250 are connected to ROM 254 and RAM 256 in a conventional manner, and are also used by logic 274 to selectively enable latch 258 and/or register 264.

Latch 258 and register 264 are used in the preferred embodiment in conjunction with line drivers/receivers 262 to drive an RS-232 serial data line connecting reader 10 to auxiliary component 26. Register 264 contains states programmed by a user via DIP (dual inline package) switches 266 to configure various options of the RS-232 protocol (e.g., parity on/off, 7 or 8-bit data bytes, etc. all in a well known manner). The values stored in latch 264 are read by microprocessor 250 and used by the microprocessor to conform the data it sends serially to addressable latch 258 via the lowest-order bit AD0 of address/data bus 278. Line driver/receiver 262 (connected to the latch 258 output) communicates ASCII character codes representing MICR characters read from a document by reader 10 to external component 26. In addition, register 264 and DIP switches 266 may permit a user to select between other software options, as will be understood by those skilled in the art.

Microprocessor 250 reads the data stored in RAM 256, and analyzes this data in accordance with a MICR recognition routine to be discussed in greater detail shortly. Microprocessor 250 produces a resultant string of ASCII character codes which represent the characters magnetically read by reader 10, and applies this string of character codes to RS-232 serial connector port J2 via address/data bus 278 and line driver/receiver 262. Microprocessor 250 is also capable of receiving RS-232 handshaking signals (e.g., "CTS"—clear to send) via pin 5 of serial port connector J2—those signals being available through register 264 and selectively enabled by the microprocessor onto its address/data bus 278.

Flip-flop 272 is used in the preferred embodiment to divide the 8 MHz CLKOUT clock signal produced by microprocessor 250 down to the 4 MHz clock timing signal ADCLK required by A/D converter 200. The Q output of flip-flop 272 is connected to pin 8 of connector J1. Microprocessor 250 produces an output on port bit PCS0 which is applied to connector J1 pin 4 to select (effectively address) A/D converter 200. Every time microprocessor 250 addresses A/D converter 200, the converter enables its data outputs and also begins converting the next sample. In the preferred embodiment, microprocessor 250 pauses every time DMA request latch 208 is set, this pause allowing the internal direct memory access controller within the microprocessor to transfer a byte of data available on the output of A/D converter 200 into a storage location in RAM 256.

Figure 13:
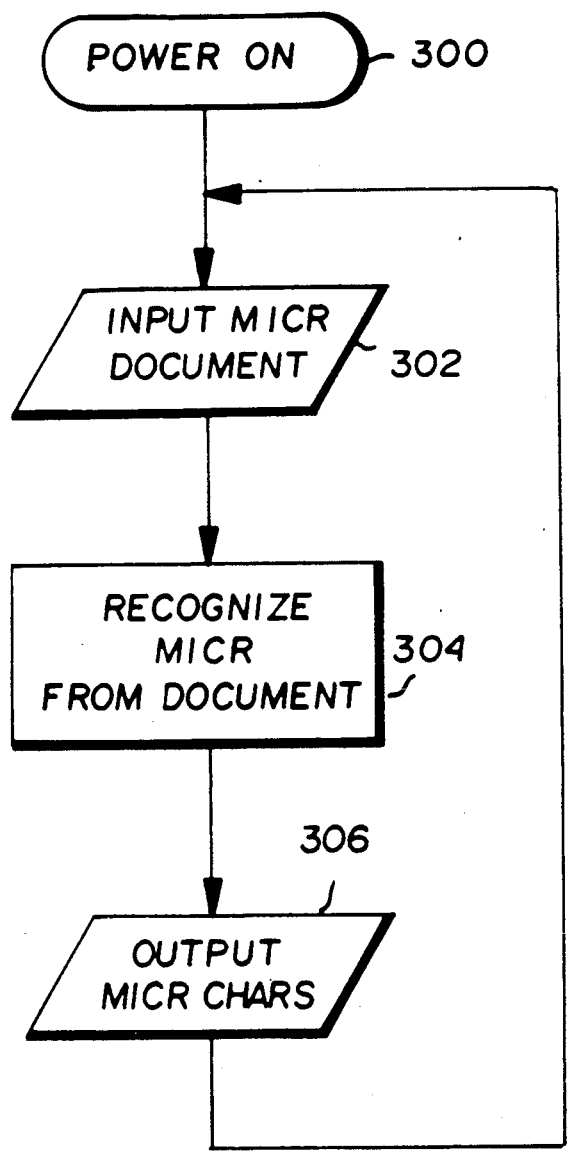
FIGS. 13 is a flow chart of exemplary program control steps performed by the microprocessor in the preferred embodiment.

FIG. 13 is a flow chart of exemplary program control steps performed by microprocessor 250 in the preferred embodiment. Instructions specifying the steps shown in FIG. 13 (and subsequent FIGS.) are stored in ROM 254 and are accessed more or less sequentially by microprocessor 250 in a conventional manner. Flow of the flow charts is from top to bottom.

When power is first applied to reader 10 (block 300), various components including microprocessor 250 are reset to prepare reader 10 for recognizing the characters on a document. Subsequently, reader 10 simply waits for a document to be inserted into a reader and moved linearly past MICR read head 60 to rotate idler wheel 46. Watchdog timer 268 must be signaled frequently (e.g., once every 100 ms) by microprocessor 250 applying a signal to the timer "ST" pin. If watchdog timer 268 fails to receive a signal from microprocessor 250 within this time period, the timer resets circuit 40.

Microprocessor 250 senses that a document is being "swiped" through reader 10 when it receives a pulse DRQ$\phi$ from DMA request latch 208 (block 302)—this pulse indicating that code wheel 48 has rotated through a predetermined angular displacement. Because of the mechanical braking of idler 46 by means of pressure member 64 described previously, the code wheel 48 rotates only when a document is moved through reader 10. In the preferred embodiment, bytes of converted data are transferred from A/D converter 200 directly into RAM 256 while the document passes through reader 10. After DMA request latch 208 ceases producing pulses DRQ$\phi$ (indicating that the document is no longer moving past MICR read head 60 and usually indicating that the entire document has been "swiped" past the read head), microprocessor 250 analyzes the data stored in RAM 256 to recognize the MICR characters read from the document (block 304). Microprocessor 250 outputs ASCII character codes corresponding to the recognized MICR characters via RS-232 serial connector J2 (block 306).

Figure 14:
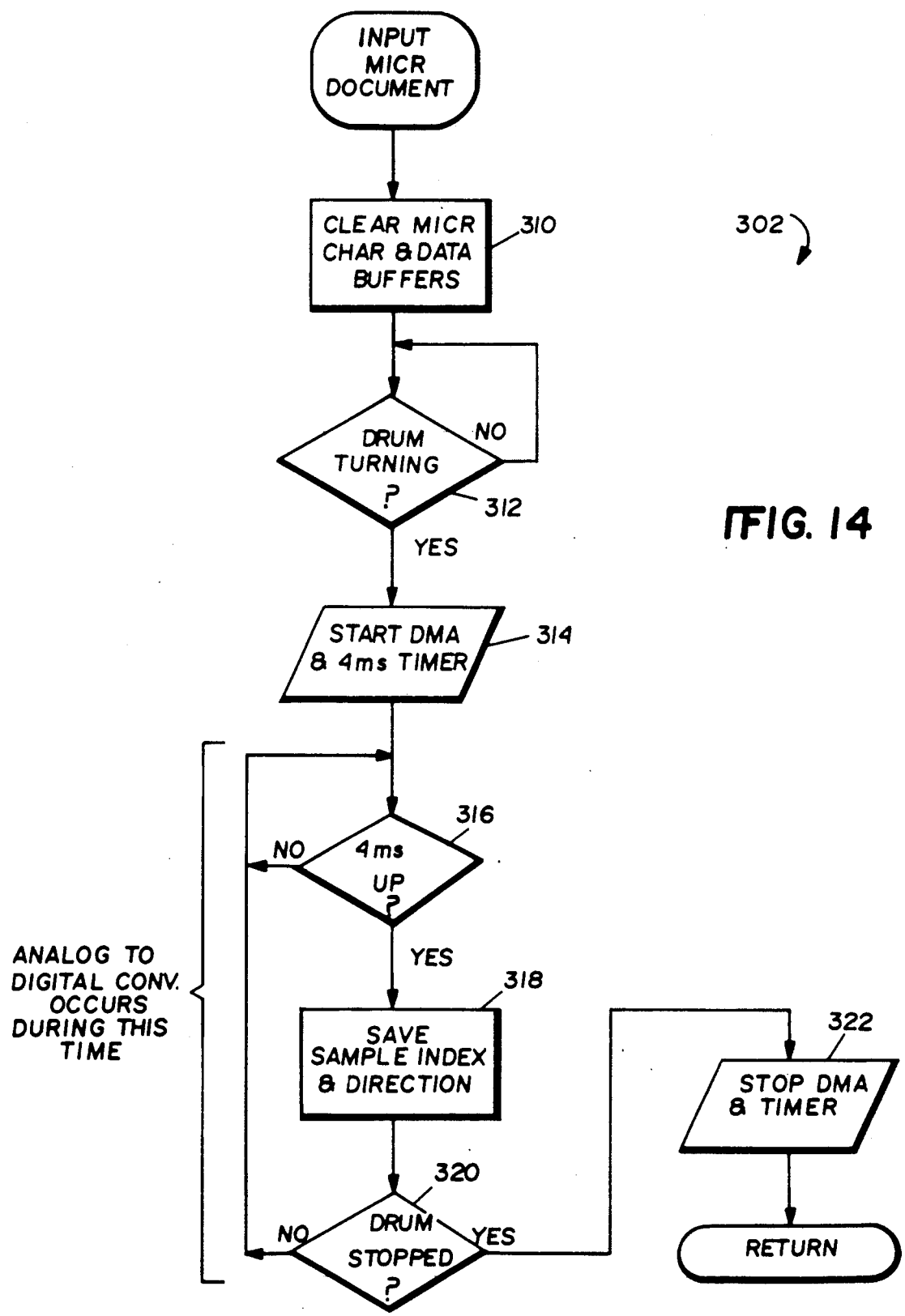
FIG. 14 is a more detailed flow chart of the "input MICR document" block shown in FIG. 13.

FIG. 14 is a more detailed flow chart of the "input MICR document" block 202 shown in FIG. 13. Microprocessor 250 first clears various internal registers and RAM 256 memory locations in preparation for analyzing new data (block 310), and then waits for a DRQφ pulse from DMA request latch 208 indicating that a document is passing through reader 10 (decision block 312). When a DRQφ pulse is received by microprocessor 250, the microprocessor begins performing a conventional direct memory access routine which permits data produced by A/D converter 200 to be written directly into RAM 256 (block 314). This direct memory access process continues as long as the document continues to pass through reader 10 and wheel 46 continues to turn.

In somewhat more detail, microprocessor 250 uses an internal direct memory access facility to transfer data from A/D converter 200 to RAM 256. Every time microprocessor 250 receives a DRQφ pulse (those pulses being derived from light detector circuitry 204 and thus continuously synchronized with the movement of a document with respect to read head 60), it "addresses" A/D converter 200 by producing the signal ADC. A/D converter 200 performs two tasks in response to this ADC signal: (a) it enables the digital last converted sample results onto its data output, and (b) it begins converting the next sample. Hence, A/D converter 200 captures the analog signal in response to the signal DRQφ derived from code wheel 48. Microprocessor 250 ensures that the samples produced by A/D converter 200 are written into RAM 256 (in sequential memory locations in the preferred embodiment). During the time the direct memory access routine is being executed, the microprocessor 250 internal DMA controller decrements a hardware "sample index" counter each time a DRQφ pulse is received from latch 208.

In the preferred embodiment, microprocessor 250 periodically times a 4 millisecond period (decision block 316). Every time this time period elapses, microprocessor 250 stores the contents of "sample index" in a separate velocity table area of memory (block 318). In addition, microprocessor 250 increments a memory variable "DIRECTION" if signal DIR is at logic level 1, and otherwise decrements the memory variable. Microprocessor 250 then determines whether DRQφ pulses are still being produced by DMA request latch 208 (decision block 320). If pulses are still being produced, the document is still moving through reader 10 and microprocessor 250 times another 4 millisecond period (decision block 316). If, on the other hand, DMA request latch 208 has ceased producing pulses, microprocessor 250 assumes the document has already passed through reader 10 and the resulting digitized MICR read head analog waveform information is now stored in RAM 256 (along with the sample index values corresponding to 4 millisecond time periods and a count "DIRECTION")—and halts the direct memory access process (block 322) to return to main routine block 304 shown in FIG. 13. Block 304 in FIG. 13 (which analyzes the data stored in RAM 256 in order to recognize MICR characters on the document) is shown in greater detail in FIGS. 15-15M.

In many or all prior art systems, it was necessary to transport a document in a predetermined direction past read head 60 (e.g., right-to-left) in order for proper recognition to occur. In accordance with the present invention, in contrast, a user can pass the document past the read head in either of two directions (e.g., left to right, or right to left) depending upon his preference, and MICR recognition circuit 40 is nevertheless capable of analyzing the data produced by the read head and recognizing the MICR characters imprinted on the document. This additional flexibility permits reader 10 to be physically mounted in any convenient position and has other advantages as well (e.g., it facilitates operation of the reader by left-handed people). For accurate reading the only requirement is that the user insert the document with the MICR characters facing read head 60.

Figure 15:
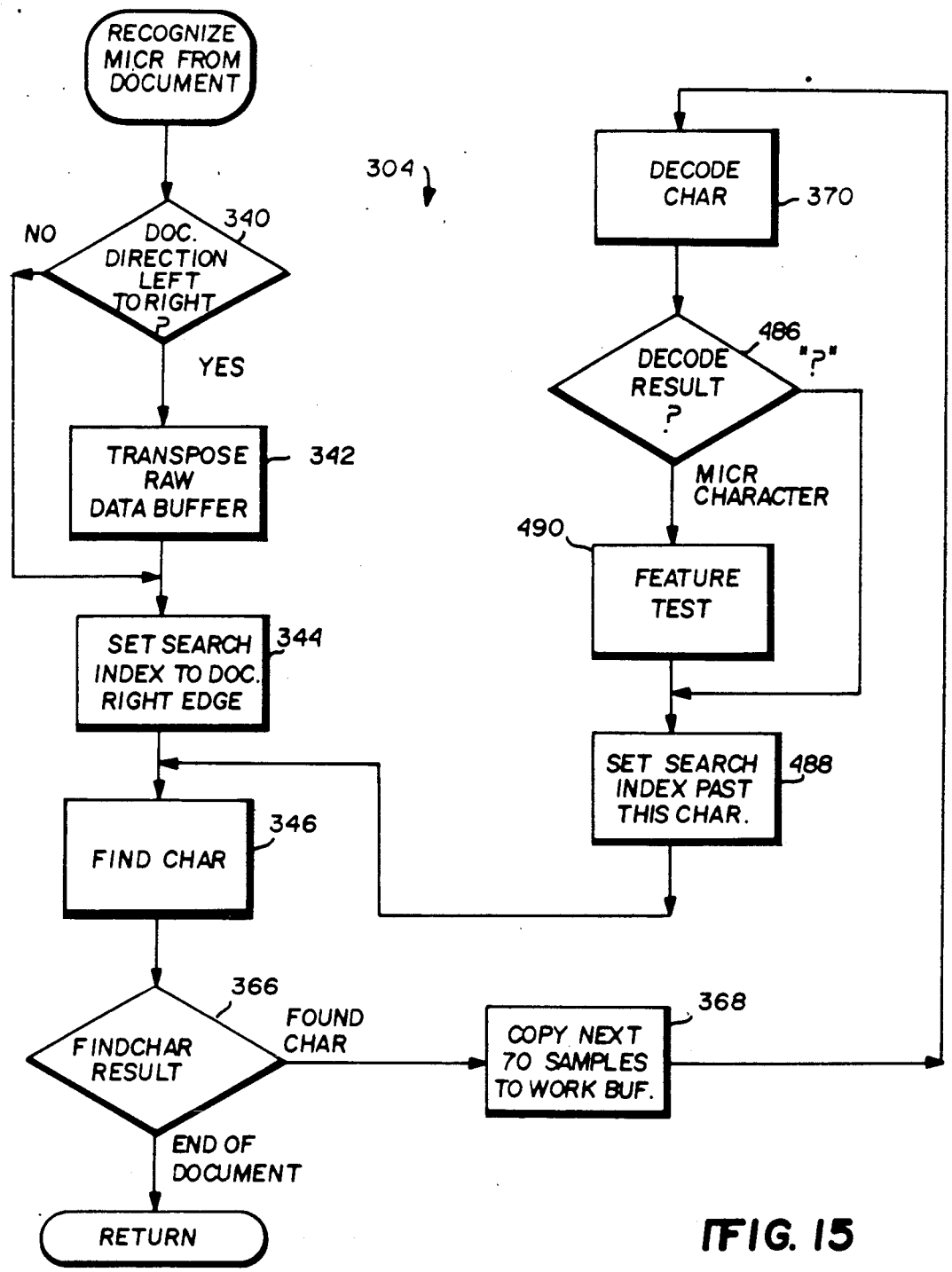
FIGS. 15-15N are more detailed flow charts of the "recognize MICR from document block" shown in FIG. 13.

Referring now to FIG. 15, microprocessor 250 determines the direction the document moved through reader 10 by examining the sign (positive or negative) of the contents of the memory variable "DIRECTION" (a count rather than a single bit in the preferred embodiment to prevent erroneous direction indications from being generated due to backlash of wheel 46 at the very end of document travel) (decision block 340). If decision block 340 reveals that a document was moved through reader 10 in a direction from left to right, microprocessor 250 transposes the raw data stored in RAM 256 so the data is presented to the microprocessor in right-to-left order (block 342). Microprocessor 250 of the preferred embodiment can thus identify waveform features represented by the stored samples in the same order regardless of the order in which the magnetic character pattern features are presented to read head 60. In the preferred embodiment, this transposition is performed by actually rewriting the data in reverse order (i.e., swapping bytes between the top and bottom of the data block stored in RAM 256 so that the data is rewritten in reverse order into the same area of memory), although it will be understood that the transposition could also be performed by manipulating memory address pointers rather than by actually rewriting the data.

Microprocessor 250 then sets a memory pointer to address the data stored in RAM 256 corresponding to the right-most edge of the document, (block 344). In the preferred embodiment, this data is located by referring to the "simple index" counter. This search process could also be performed by scanning through RAM 256 until the sample corresponding to the sample index information 218 last written into the RAM by microprocessor 250 is located.

Once the "end" of the data block corresponding to the most recently read document has been located within RAM 256, microprocessor 250 scans back into the data block in order to find the data corresponding to the first positive peak of the right-most MICR character printed on the document (block 346). A more detailed flow chart of this "FIND CHAR" routine 346 is shown in FIG. 15B.

Figure 15A:
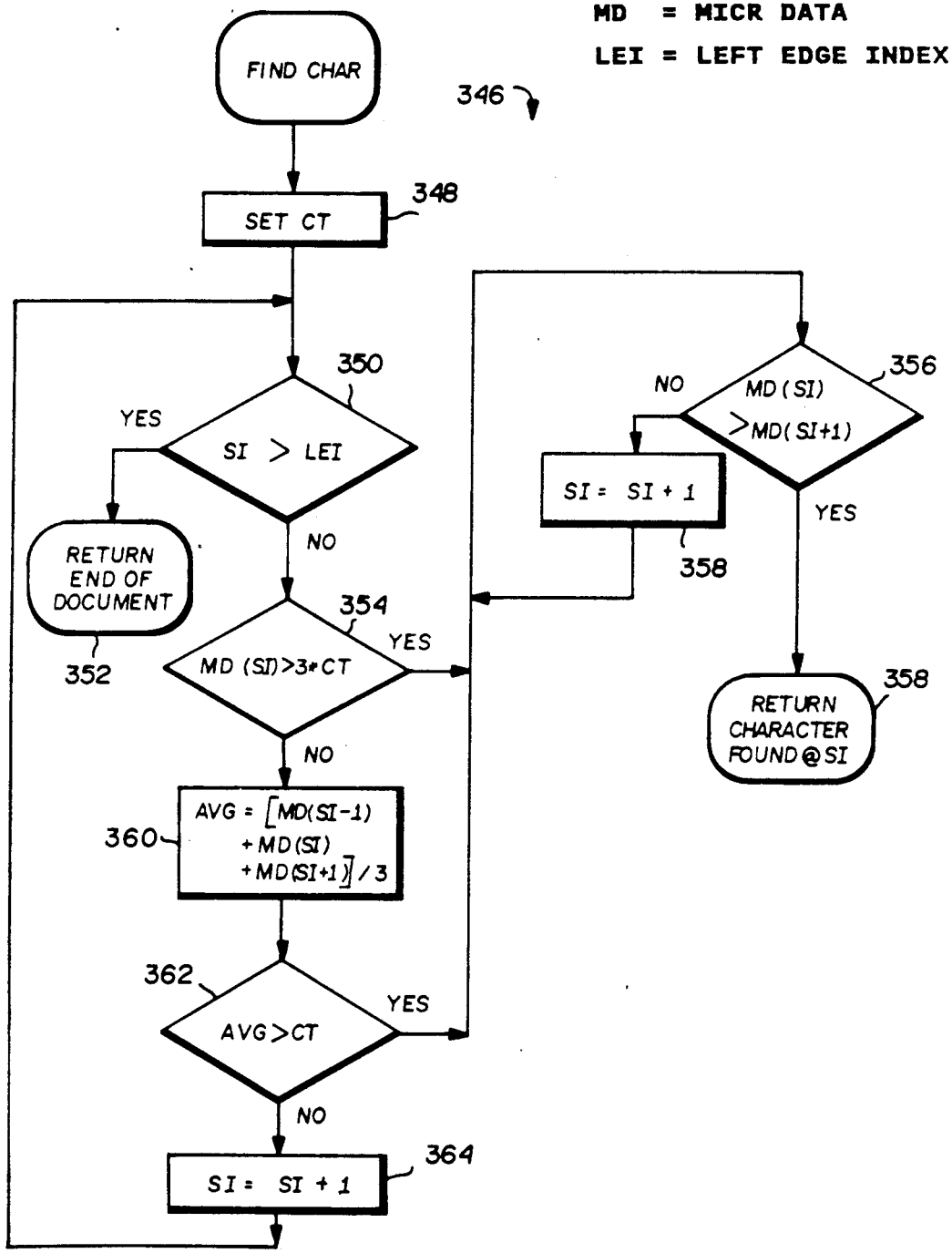
Figure 15B:
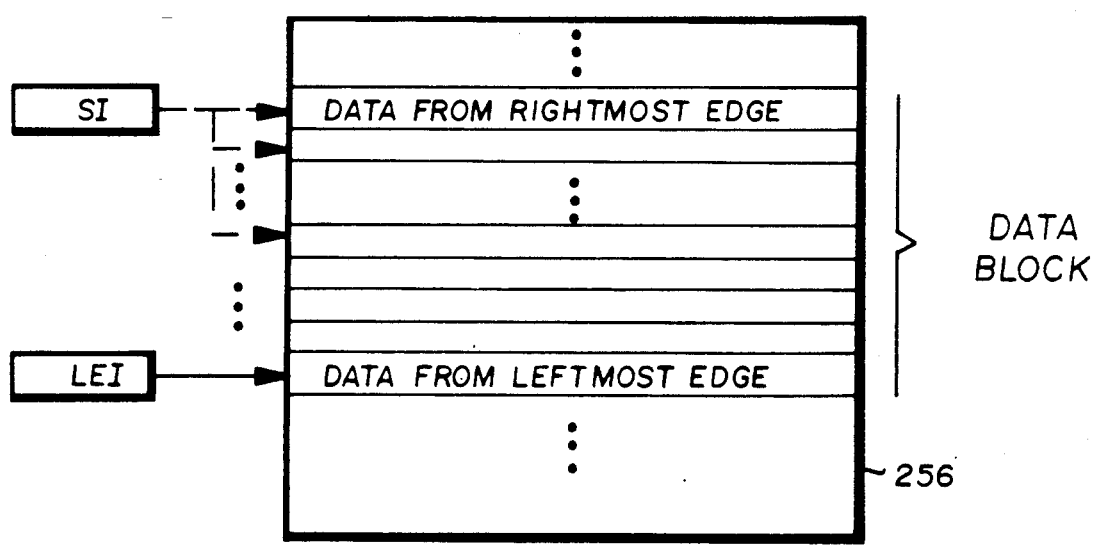

Referring now to FIG. 15B, a nominal character threshold level CT is set by microprocessor 250 to be used in order to help discern between data stored in RAM 256 representing noise and data stored in the RAM representing the first positive peak of a MICR character (block 348). A pointer SI is used to address storage locations within RAM 256, this pointer SI having been set initially to index the sample corresponding to the document right-most edge (FIG. 15A block 344). As shown in FIG. 15B, if pointer SI exceeds another index LEI corresponding to the left-most edge of the document (as tested for by decision block 350), then SI is addressing a RAM 256 location which does not contain any data from the last-read document—and microprocessor 250 assumes that the entire data block stored in RAM 256 has already been scanned for characters by the FIND CHAR routine 346 and returns with an "end of document" completion code (block 352). If, on the other hand, search index pointer SI is within the data block corresponding to the last-read document, the RAM 256 storage location pointed to by SI is read and compared with three times the character threshold level CT (decision block 354).

If the read data is three times greater than the threshold level CT, microprocessor 250 determines that the data pointed to by SI may correspond to the first positive peak ("leading edge") of a MICR character. The data for the next "left-most" sample is then tested to determine if it has a level which exceeds that of the location currently pointed to by SI (decision block 356). If decision 356 reveals that a still greater value is stored in the storage location corresponding to the sample taken from the document position immediately to the left of the sample pointed to by the pointer SI, SI is incremented to point to that next sample (block 358) and the comparison performed by decision block 356 (and the incrementing of pointer SI by block 358) is repeated until SI points to the RAM 256 storage location containing the neighboring sample with the highest amplitude (and thus representing the first positive peak of the MICR character). In this way, microprocessor 250 selects the sample SI captured by A/D converter 200 in response to a pulse DRQ$\phi$ corresponding in timed relation with the occurrence of a signal from read head 60 responsive to the first (leading edge) segment of a MICR character. This value SI is returned to the FIG. 15 routine for character decoding (block 358).

If decision block 354 reveals that the data indexed by SI does not exceed three times the character threshold CT, the data possibly does not correspond to the first positive peak of a MICR character. However, an additional test using the average of three adjacent samples is performed by blocks 360, 362 in the preferred embodiment to insure a positive peak has not been missed. In particular, the preferred embodiment computes the average of the sample pointed to by SI, the sample immediately before the SI sample, and the sample immediately after the SI sample—and compares the resulting average with character threshold CT. Thus, the preferred embodiment detects data corresponding to the beginning of a MICR character either when a single sample exceeds three times a predetermined threshold CT, or when the average of three successive samples exceeds the threshold CT. The additional tests performed by block 360, 362 prevent the preferred embodiment from mistaking noise or spurious ink patterns for a MICR character leading edge, but insure that low-density ink characters are not "missed." The steps of blocks 356, 358 are performed if decision block 362 reveals the average value exceeds the threshold. If, on the other hand, the tests performed by decision blocks 354 and 362 both fail, microprocessor 250 determines that index SI does not point to the beginning of a MICR character, increments SI (block 364), and repeats the steps of blocks 350-364 until the first positive peak of a MICR character is located.

FIG. 15 decision block 366 tests the completion code returned by FIND CHAR routine 346 to determine whether the routine has returned a search index SI value corresponding to a RAM 256 storage location containing the first positive peak of a MICR character, or alternately, whether SI has been advanced past the end of the RAM data block corresponding to the last-read document without locating a first positive peak. If the latter condition has occurred, all characters from the last-read document have been processed, and program control returns to main routine block 306 to output characters codes and wait for another document.

On the other hand, if the FIND CHAR routine has located a character, the "next" N samples are copied into a work buffer located, for example, in another area of RAM 256 (block 368) and the microprocessor analyzes those N samples to identify the corresponding MICR character (block 370). The number N of samples copied into the work buffer depends upon the distance per sample (i.e., the diameter of idler wheel 46 and the resulting sample index count responsive to DRQ$\phi$ pulse occurrence) and does not depend upon document velocity in the preferred embodiment (because samples in the preferred embodiment occur in response to movement of a document a predetermined distance, not in response to time) Enough samples N are copied to include samples corresponding to the entire width of the character being tested. Thus, in the preferred embodiment the content of RAM 256 memory location pointed to by search index SI and the contents of the successive 70 locations (corresponding to samples from 69 discrete distance intervals of the document oriented to the left-hand side of the document distance interval corresponding to the SI sample) are analyzed by the decode character algorithm 370.

FIGS. 15C-15F are detailed flow charts of the decode character routine 370 shown in FIG. 15A. Decode character routine 370 is responsive to a combination of stored data for indicating the identity of the MICR character under test. In particular, routine 370 analyzes N consecutive samples of A/D converter 200 corresponding to a MICR character in order to identify the MICR character. The first step performed by decode character routine 370 is to normalize the level of the samples by summing the absolute values of all of the samples, computing a normalization factor from the sum, and then multiplying the samples by the normalization factor. The purpose of this normalization process (block 372) is to reduce the effect on the decoding process of variations in ink density from character to another and from one document to another. Those skilled in the art will understand that analog automatic gain control circuitry provides a somewhat analogous function.

Figure 15E:
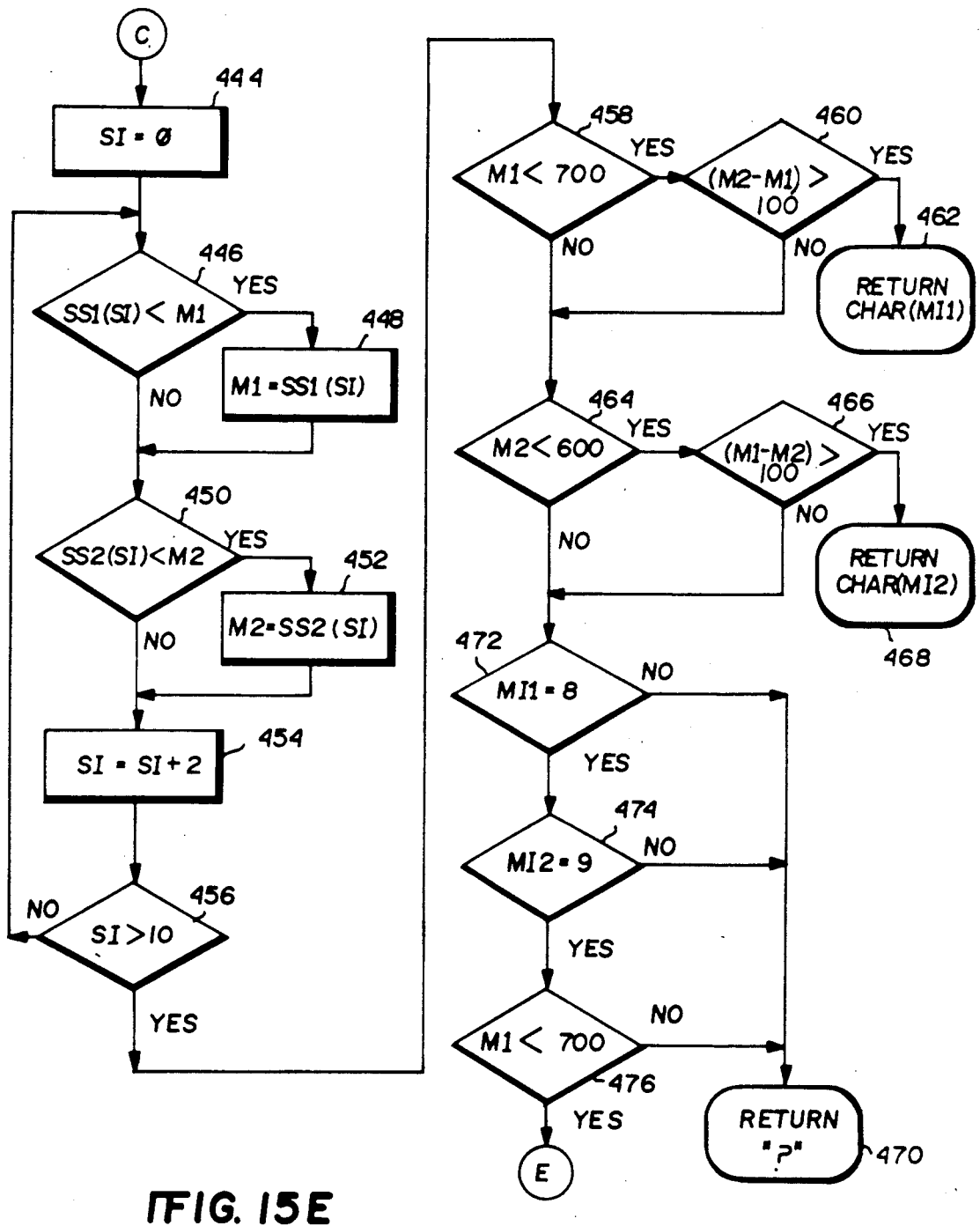
Figure 15F:
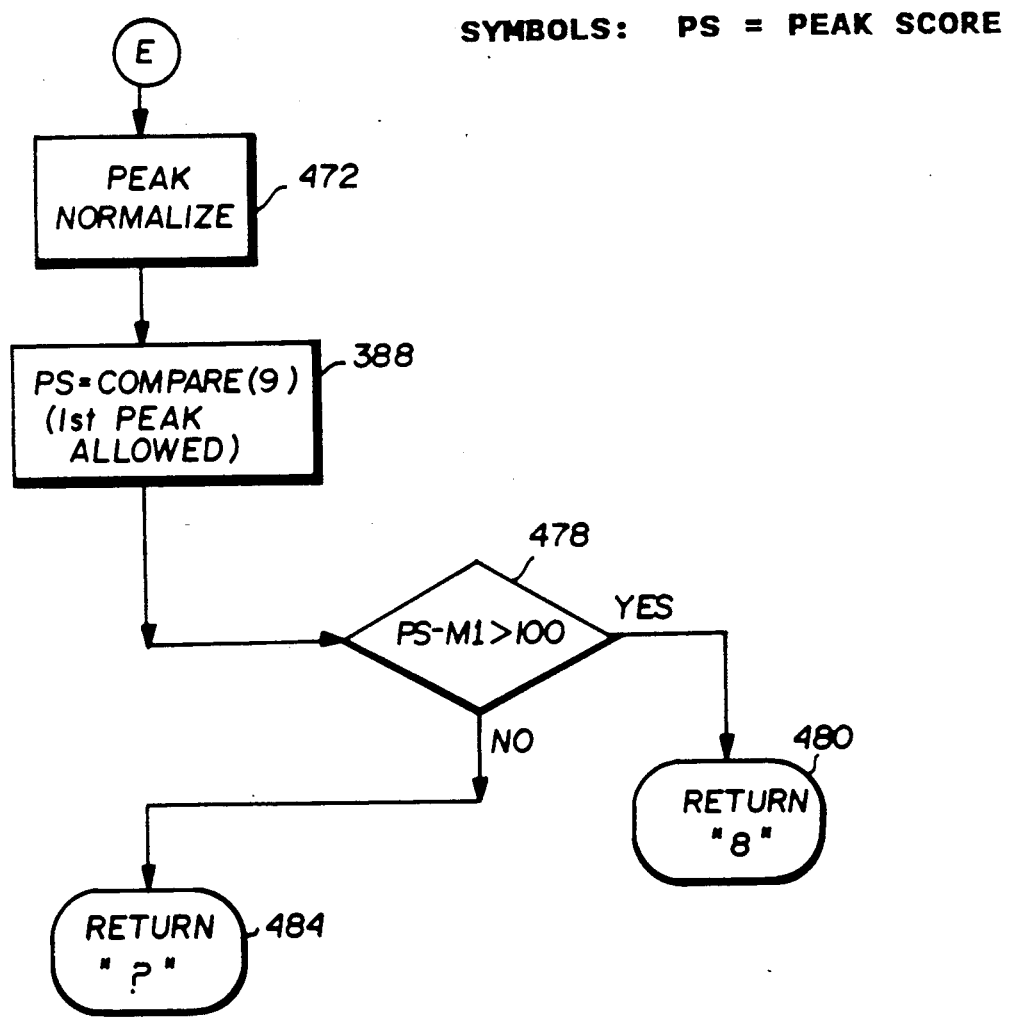
Figure 15G:
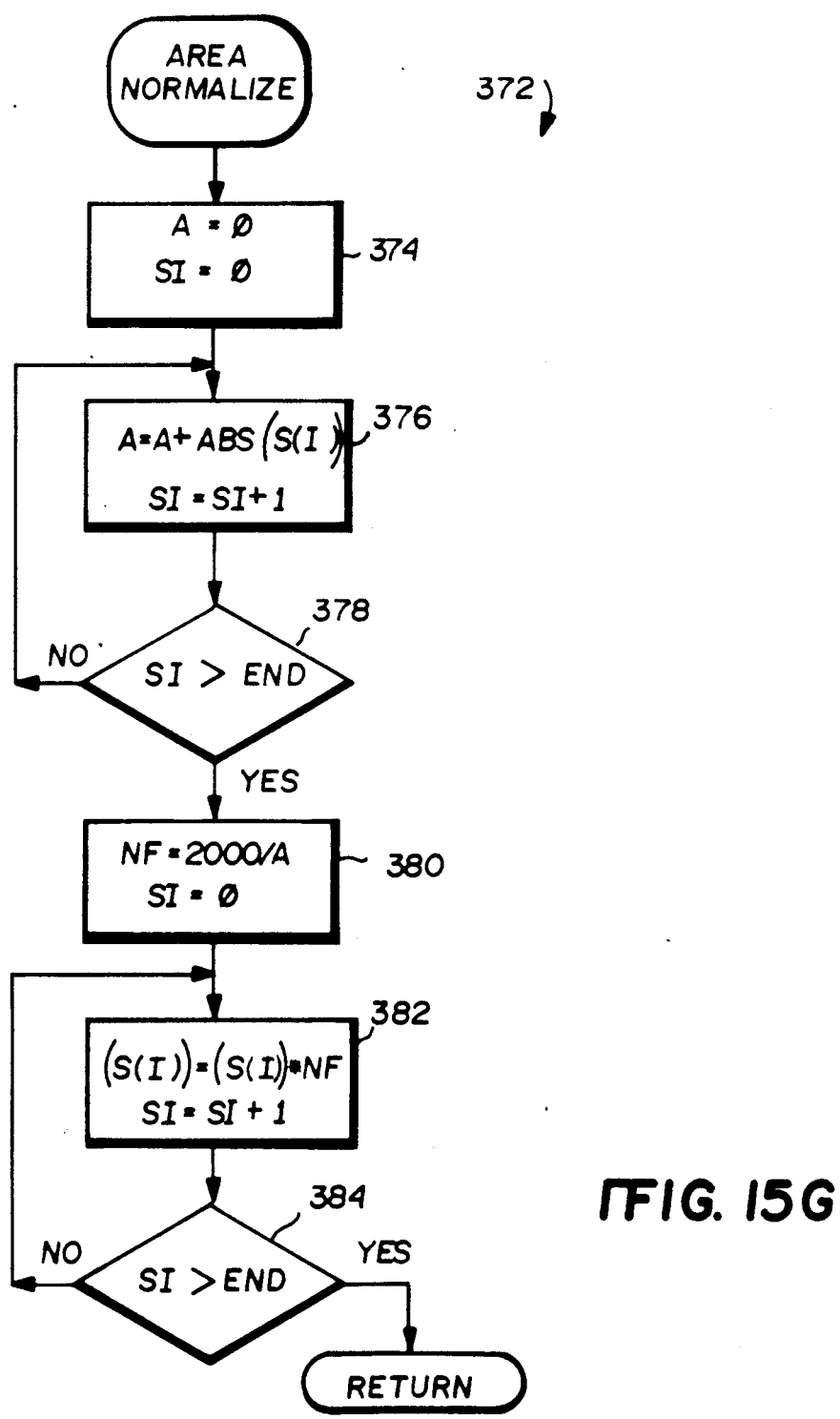

Referring now to FIG. 15G, the normalization routine 372 begins by resetting two variables, A and SI, to have zero values (block 374). In the preferred embodiment, A stores the computed area under the amplitude curve represented by the stored samples being analyzed, while SI is a memory pointer now being used to index the stored samples within the work buffer (it will be understood that different pointers may be used to address the raw data block and the work buffer contents if desired). Blocks 376, 378 then sequentially calculate the absolute value of each of the 70 stored samples and add the calculated absolute values to A. The resulting value stored in A is a summation of the absolute values of all of the samples stored in the work buffer—equivalent to the total area under the amplitude curve represented by the stored samples.

After this summation process, a normalization factor NF is calculated in the preferred embodiment by dividing a constant (2,000 in the preferred embodiment) by sum A (block 380). The pointer SI is also reset to zero at this time. Blocks 382, 384 then multiply each of the samples stored in the work buffer by the normalization factor NF so calculated. In this way, the area under the amplitude curve represented by the samples is normalized.

Referring once again to FIG. 15C, after normalization routine 372 has been performed, some "score" or comparison variables are initialized by block 386, these variables including a "minimum score 1" variable M1, a "minimum score 2" variable M2, and a character index value CI. CI is initialized to zero in the preferred embodiment, while both minimum score values are initialized to a predetermined constant value (e.g., 32,000). As will be explained, during the character recognition process in the preferred embodiment, "points" are taken away from these minimum score values M1 and M2 as an indication of the "match" between samples being analyzed and an idealized MICR waveform. The character index CI is used to keep track of which MICR character is being tested for.

Briefly, a "compare" routine 388 is performed to compare samples under test with positive and negative threshold levels for each of the 13 MICR characters. Two characters with the lowest comparison "scores" are found. Then, the idealized threshold levels are effectively shifted along the document length with respect to the position of the MICR character under test, and new comparison scores are calculated. Based upon these tests, microprocessor 250 is generally able to identify the MICR character and return a character code. In questionable cases, a "?" character code is returned indicating that the character cannot be identified. A peak normalization process is occasionally performed to distinguish between the characters "8" and "9".

Figure 15H:
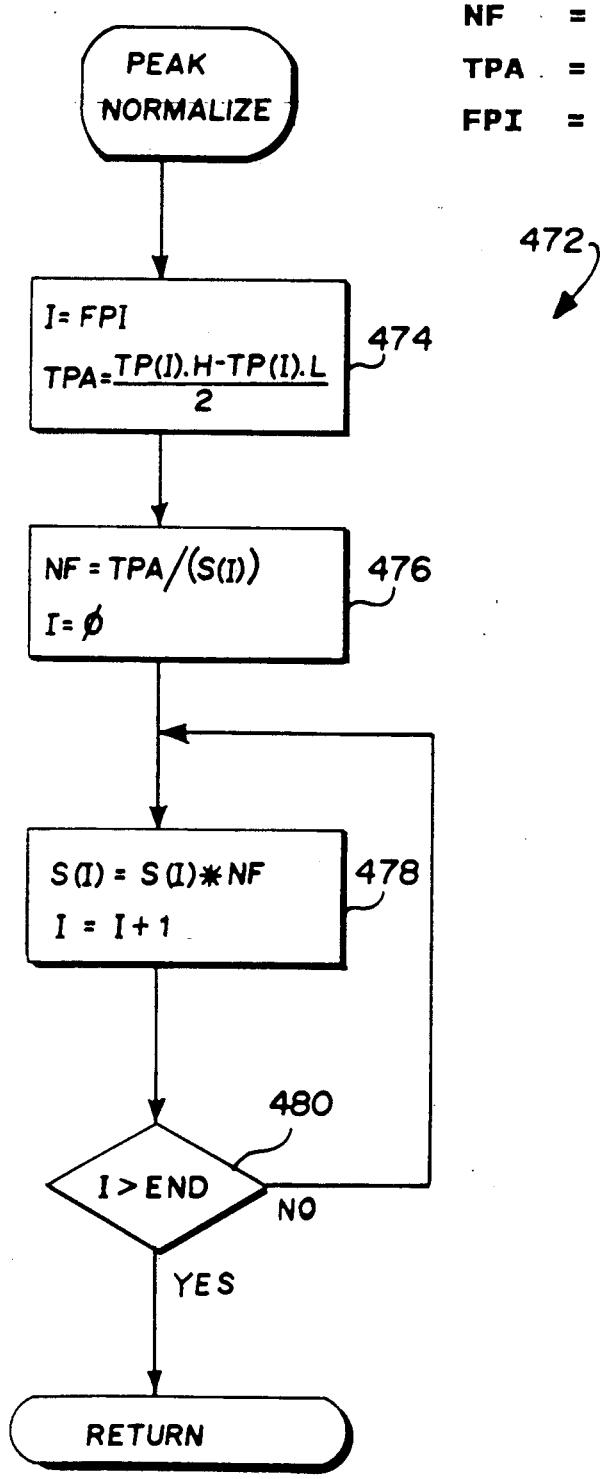
Figure 15I:
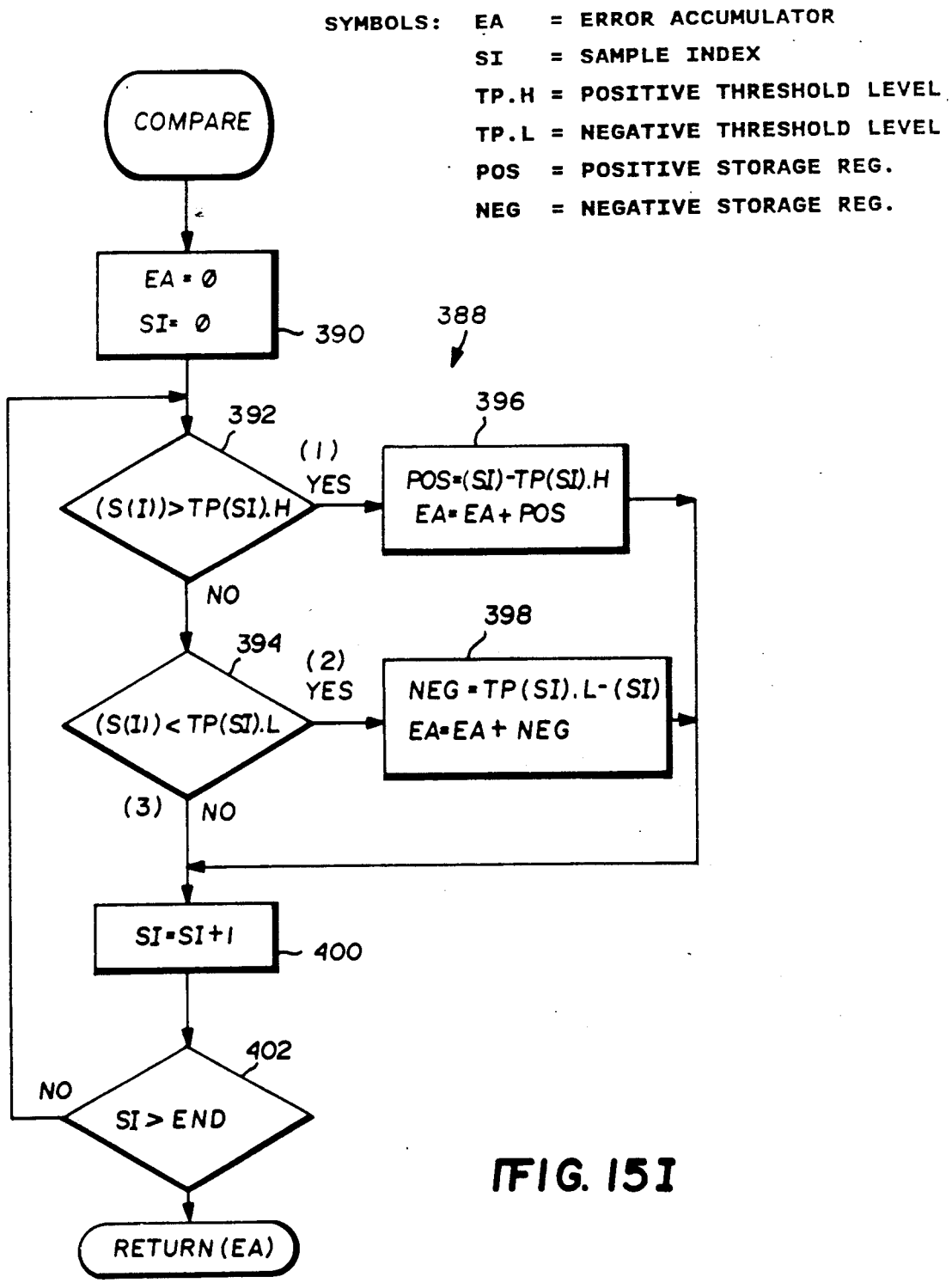

A detailed flow chart of the "compare" routine 388 is shown in FIG. 15I. This routine uses an error accumulator EA, a sample indicator SI, high and low idealized threshold levels TP·H and TP·L, and positive and negative storage registers POS and NEG, respectively. The routine first initializes EA and SI to zero (block 390), and then compares the sample pointed to by SI with an idealized positive threshold (decision block 392) and an idealized negative threshold (decision block 394). Decision blocks 392, 394 produce one of three possible output states: (1) the sample exceeds the positive threshold, (2) the sample is less than the negative threshold, or (3) the sample is between the positive and negative thresholds. For state (1), the positive threshold level TP·H is subtracted from the sample and the difference is stored in register POS. The contents of register POS is then summed into error accumulator EA (block 396) For state (2), the sample is subtracted from the negative threshold level TP·L and the difference is stored into the negative register NEG. The contents of register NEG is then summed into error accumulator EA (block 398). Thus, error accumulator EA stores, for successive samples, digital signals representing excursions of the MICR waveform above and below "high" and "low" acceptable boundary levels. It will be understood that these sum and difference calculations can be performed in a variety of different, equivalent ways if desired. Block 400 then increments the sample index to the next sample, and blocks 392–400 are repeated until all 70 samples have been processed (as tested for by decision block 402). Compare routine 388 returns the error accumulator value EA to decode character routine 370.

The idealized high and low thresholds used in the preferred embodiment depend upon the character indicated by character index CI and on the sample index SI. That is, the positive and negative threshold levels used in the preferred embodiment are not constant across a character or from one character to another in the preferred embodiment. Rather, the thresholds are changed across a character in order to track the expected positive and negative peaks of the character being tested for, and the thresholds are also adjusted to take into account which character is currently being tested for. The various threshold levels are stored in EPROM 254 in tabular form in the preferred embodiment, and the particular threshold accessed by compare routine 388 at any given time is determined in response to both the sample index SI and the character index CI.

Compare routine 388 returns to FIG. 15C decision block 404, the error accumulator value EA. If the value EA returned by compare routine 388 is less than 100 in the preferred embodiment, the match between the sample data under tests and the idealized positive and negative threshold levels for idealized character CI is so close that the character under test can immediately be identified as character CI and the character code corresponding to character CI is returned to FIG. 15A routine 304. Often, however, the results of compare routine 388 are somewhat more ambiguous.

In the preferred embodiment the two closest matches are kept track of so that if no very close match is revealed by the test of decision block 404 for a character subsequently tested for, further tests can be performed so as to identify the sample data as corresponding to one of the two characters which match closely. In particular, variable M1 is used to store the lowest error accumulator value EA, and variable M2 is used to store the second closest value EA returned by compare routine 388. If the value EA returned by compare routine 388 is less than a previously returned minimum score M1, the new EA value replaces the value stored in M1 and the character index CI corresponding to the new lowest score is stored in minimum index variable MI1. In addition, the previous M1 and MI1 values are stored into M2 and MI2 to keep track of the second lowest EA values (decision block 408, block 410). If the value EA returned by compare routine 388 is not less than minimum score M1 but is less than minimum score M2, EA is stored into M2 (and the character index CI corresponding to this new EA is stored into MI2) to keep track of the second lowest compare score EA (blocks 412, 414). The character index CI is then incremented to the next character (block 416) and blocks 388–416 are repeated until all thirteen MICR characters have been tested for (as determined by decision block 418). If compare routine 388 does not return a sufficiently low score for any one of the thirteen MICR character possibilities, further testing shown on FIG. 15D is performed in the preferred embodiment to identify the character.

Referring now to FIG. 15D, the same tests shown in FIG. 15C are once again performed for shifted positive and negative threshold values in order to accurately identify out-of-spec MICR characters which are longer or shorter than they should be. In particular, now that blocks 408–414 have determined the two MICR characters which the samples being tested most likely to correspond to, further tests are performed for each of those two characters in which the sample data is shifted slightly relative to the idealized threshold levels (plus or minus 0.0088 inches in the preferred embodiment) to determine if a better match can be found. A total of six tests are performed in the preferred embodiment for each of the two identified characters. First, a shift index SHI is set to value zero (block 420). This causes the positive and negative threshold values used by compare routine 388 for the character indicated by value MI1 to be shifted to the right by 0.0088 inches relative to the sample data. Compare routine 388 performs the comparison steps described previously in connection with FIG. 15I (block 422) and returns result EA. If the resulting error accumulator value EA is less than 100 in the preferred embodiment (as tested for by decision block 424), routine 370 identifies the sample data as corresponding to character MI1 and returns a character code corresponding to that character (block 426). Blocks 420-424 are repeated as necessary for the positive and negative threshold values being shifted 0.0053 inches to the right, 0.0017 inches to the right, 0.0017 inches to the left, 0.0053 inches to the left and 0.0088 inches to the left—all relative to the character position corresponding to the sample data in the preferred embodiment (block 428, decision block 430). If none of the resulting EA values from compare routine 388 are less than 100 in the preferred embodiment, these same steps are performed with respect to character MI2 (which was determined by blocks 412, 414 to be the second most likely character for identification) (blocks 432-442). If no EA correlation values less than 100 result from the shifting process, further tests shown on FIG. 15E are performed.

Referring now to FIG. 15E, it is first determined whether any of the shifted EA values are less than the EA values generated without shifting (decision blocks 446-456). Shifted EA values which are less than the unshifted EA values M1 or M2 replace the unshifted EA values. A comparison (based upon statistical probabilities) is then performed to identify the character or decide that the character cannot be identified.

In the preferred embodiment, if the lowest EA value returned by compare routine 388 for a particular character (shifted or unshifted) is less than 700 and the lowest value EA returned by compare routine 388 for any other character (shifted or unshifted) is at least 100 above the lowest EA (decision blocks 458, 460), the character code corresponding to the thresholds used to produce that lowest EA value is returned (block 462). On the other hand, if compare routine 388 returns an EA value for a shifted version of the character identified by MI2 which is more than 100 less than any EA value returned for the MI1 character and is also less than 600, the MI2 character code is returned (blocks 464-468).

If neither of these two conditions is true, then decode character routine 370 returns the "?" indicating that it cannot identify samples as being a character unless the MI1 character and the MI2 character correspond to "8" and "9", respectively and the EA value stored in M1 is less than 700 (as tested for by decision blocks 472-476). In such situations, further tests are performed by the steps shown in FIG. 15F to distinguish between an 8 and a 9.

Figure 16A:
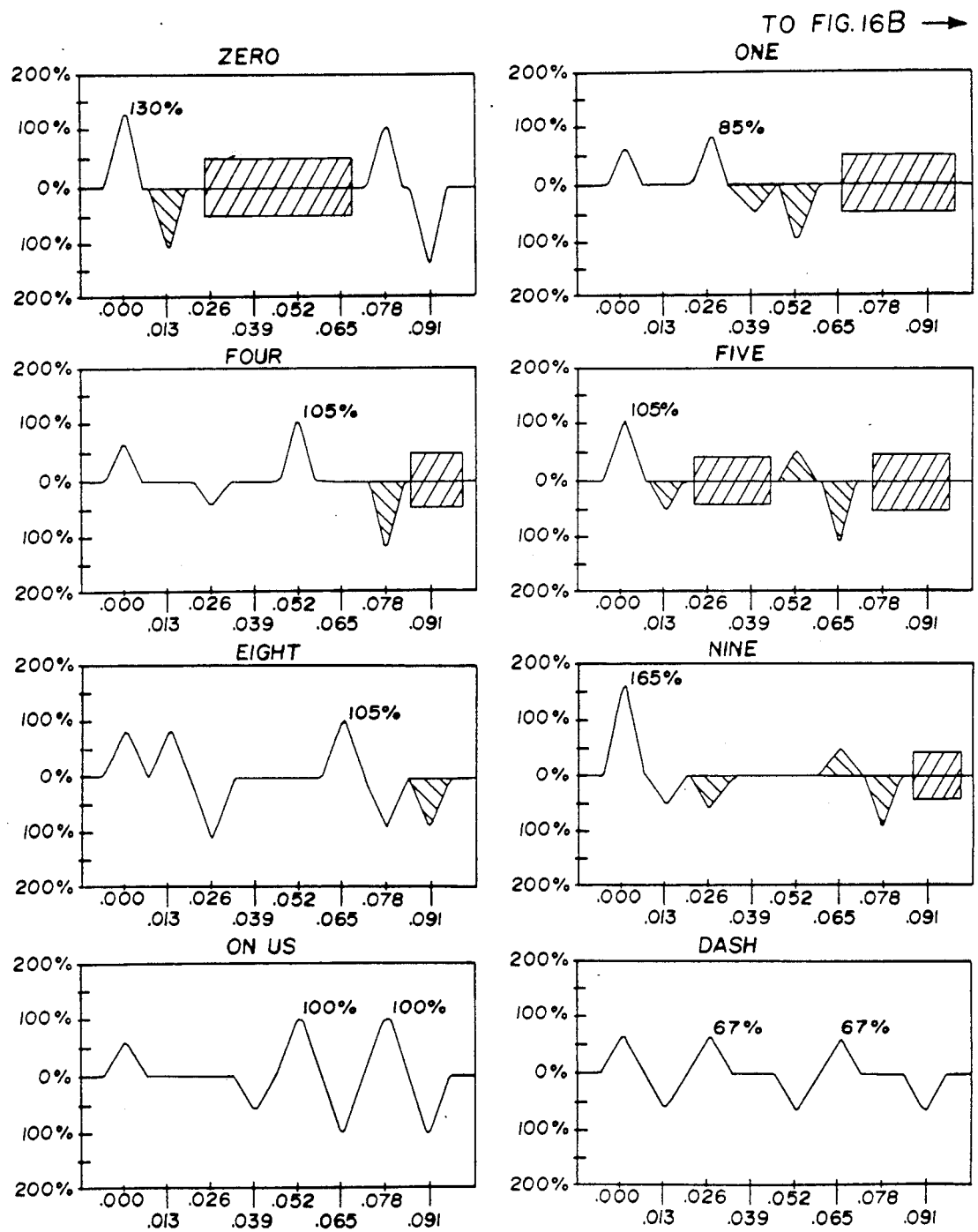

It will be understood by those skilled in the art that one difference between the waveform for the MICR character "8" and the waveform for the MICR character "9" is the height of the first positive peak (see FIG. 16A). In the preferred embodiment, a peak normalization routine 472 is performed to normalize the sample data waveform with the height of an idealized MICR character 9 waveform. A detailed flow chart of this "peak normalize" routine is shown in FIG. 15H.

Referring now to FIG. 15H, the first step performed is to determine the mean between the positive threshold level for the "9" and the negative threshold level for the "9" at the point corresponding to the first peak indicated by the sample data (block 474). A normalization factor NF is then computed by dividing this threshold level mean value by the sample first peak amplitude (block 476). All of the samples are then multiplied by this calculated normalization factor NF (blocks 478, 480) so as to normalize the sample values relative to an idealized first peak amplitude for the character 9 waveform. Referring to FIG. 16A, it will be understood that this normalization process will have little effect on sample values actually corresponding to the character "9" but will tend to increase the amplitudes of samples corresponding to an "8". Referring once again to FIG. 15F, compare routine 388 is performed using the now normalized sample data relative to the positive and negative threshold values for a "9". If the EA value returned by compare routine 388 is more than 100 greater than the value EA previously returned before peak normalization for the numeral 8, then the character code for the 8 is returned (blocks 478, 480). Otherwise, the character code "?" is returned indicating that the character cannot be identified (block 484). In this way, blocks 472-484 are used to differentiate between 8 and 9 in some instances through a process of peak normalization.

Referring now once again to FIG. 15, the character code returned by decode character routine 370 is tested to determine whether or not it is an "?" code (decision block 486). If a "?" is returned, no further attempt is made to identify the character and the search index SI is incremented past the sample data for the character just rejected so as to test for the next character (blocks 488 and 346). On the other hand, if decode character routine 370 identified a MICR character and returned a valid MICR character code, a feature test routine 490 is performed in the preferred embodiment to confirm the character identification performed by decode character routine 370. Feature test routine 490, which is shown in FIG. 15J, identifies MICR characters based upon macroscopic features of the sample waveform (e.g., peaks and quiet zones).

Briefly, feature test 490 identifies the peaks in the sample data, and then confirms that all required peaks (positive and negative) are present in the sample data and also confirms that no significant peaks of the wrong polarity are present. Finally, feature test 490 confirms that no significant peaks are present in "quiet zone" areas of the characters where no peaks should be present. Feature test 490 either confirms the character identification returned by character decode routine 370, or returns a "?" indicating that the character cannot be reliably identified.

Figure 15J:
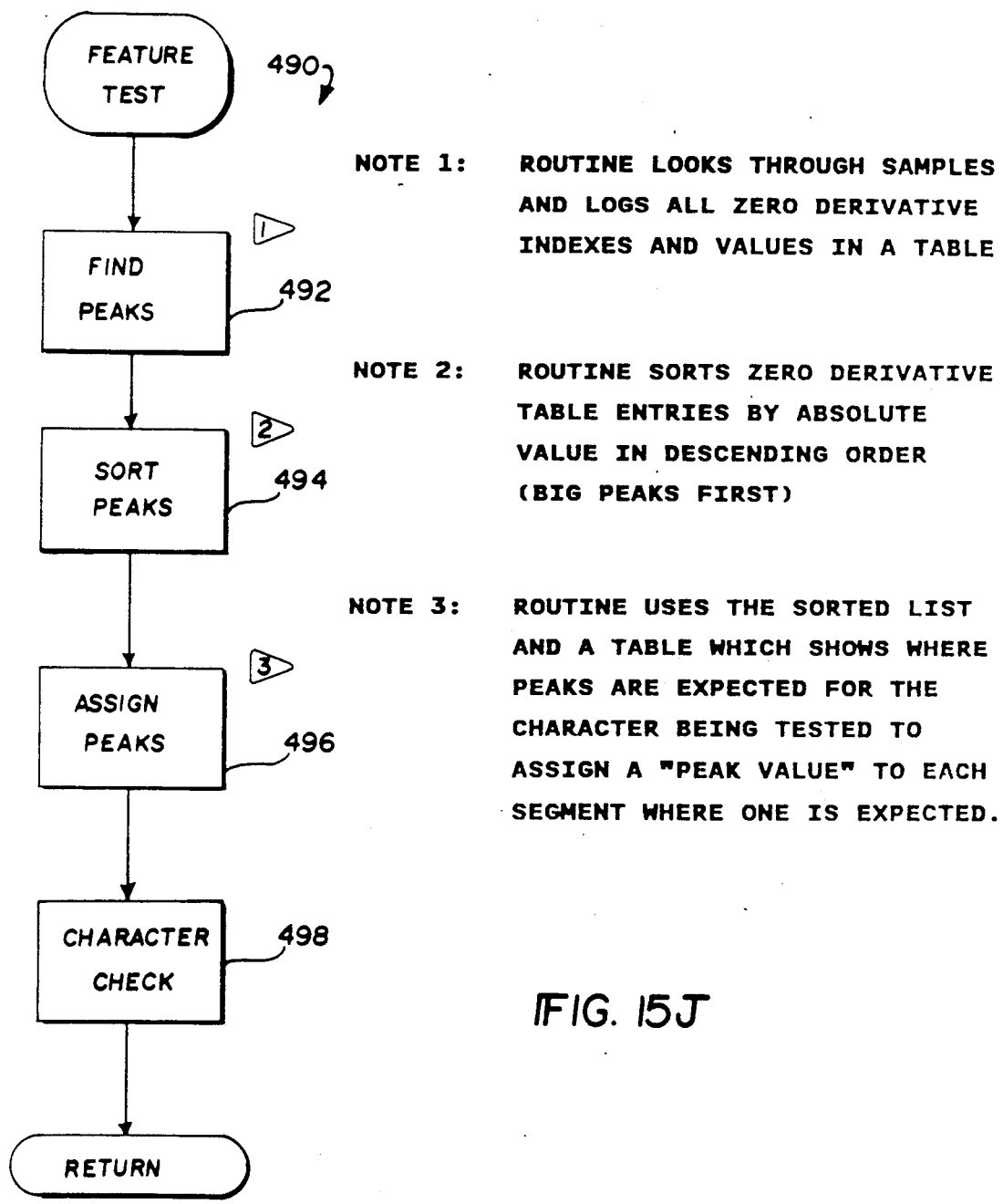

Referring now to FIG. 15J, feature test routine 490 first locates all of the peaks in the sample waveform stored in the work buffer (block 492). These peaks are located in the preferred embodiment by calculating the derivative at each sample point and then determining all instances where the derivative of the sample data waveform changes sign. This process is performed om the preferred embodiment by calculating the derivative at each sample point and then locating all adjacent samples the derivatives of which differ in sign. Once the peaks of the waveform are located in this manner, feature test routine 490 sorts the peaks located by block 492 in descending order by absolute value, so that the largest peaks are indexed first in an index list stored in RAM 256 and the smaller peaks are indexed last (block 494).

Feature test routine 490 then identifies the samples representing the located peaks which correspond in timed relation with the expected occurrences of peaks in segments of the character under test. Since a sample is stored exactly every 1.7 mils of document travel in the preferred embodiment, the preferred embodiment can identify which character segment a particular sample corresponds to once the sample corresponding to the first character segment has been determined by Find Character routine 346. In the preferred embodiment, a lookup table identifying expected peak occurrences in the MICR character which decode character routine 370 has tentatively identified is used in conjunction with sample number (that is, distance from the character leading edge to the sample) to determine which peaks in the sorted peak list correspond to which segments of the character (block 496). In the preferred embodiment, block 496 assigns a "peak value" to each character segment in which each peak is expected. A character check routine 498 is performed to compare the relevant samples isolated by blocks 492-496 with the expected features associated with the tentatively identified MICR character.

Figure 15K:
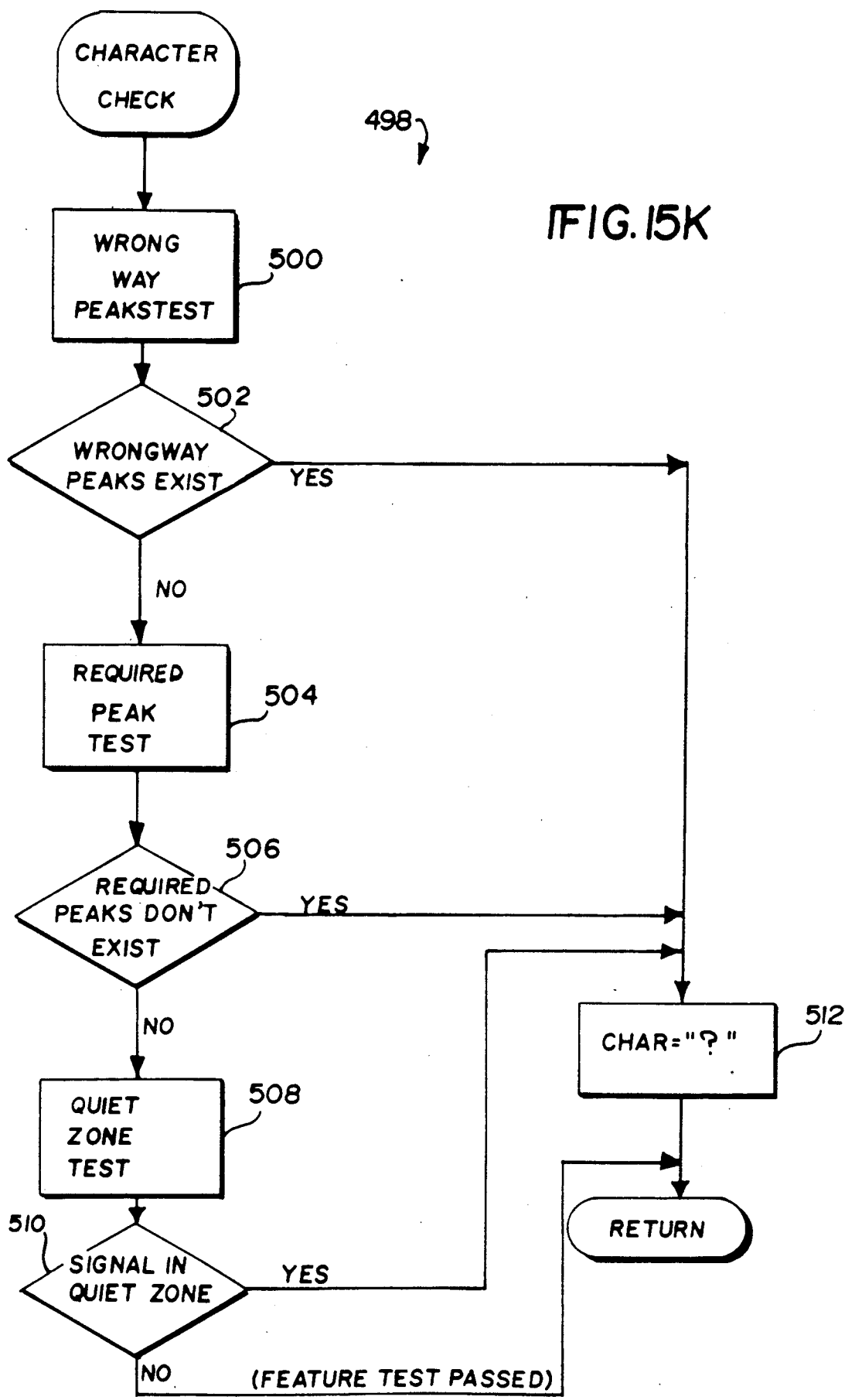

FIG. 15K is a detailed flow chart of the character check routine 498. Character check routine 498 tests to insure that no peaks of the wrong polarity exists (blocks 500, 502), then confirms that all required peaks are in fact present (blocks 504, 506), and finally performs a "quiet zone" test (blocks 508, 510) to confirm no significant peaks exist where no signal is supposed to be present (e.g., in the "silent zone" after a short character).

If the various tests show that expected significant features are present and that no unexpected significant features are present, the character code return by decode character routine 370 is returned to FIG. 13 block 306. If any one of these tests fail, a "?" character code is returned (block 512).

Figure 15L:
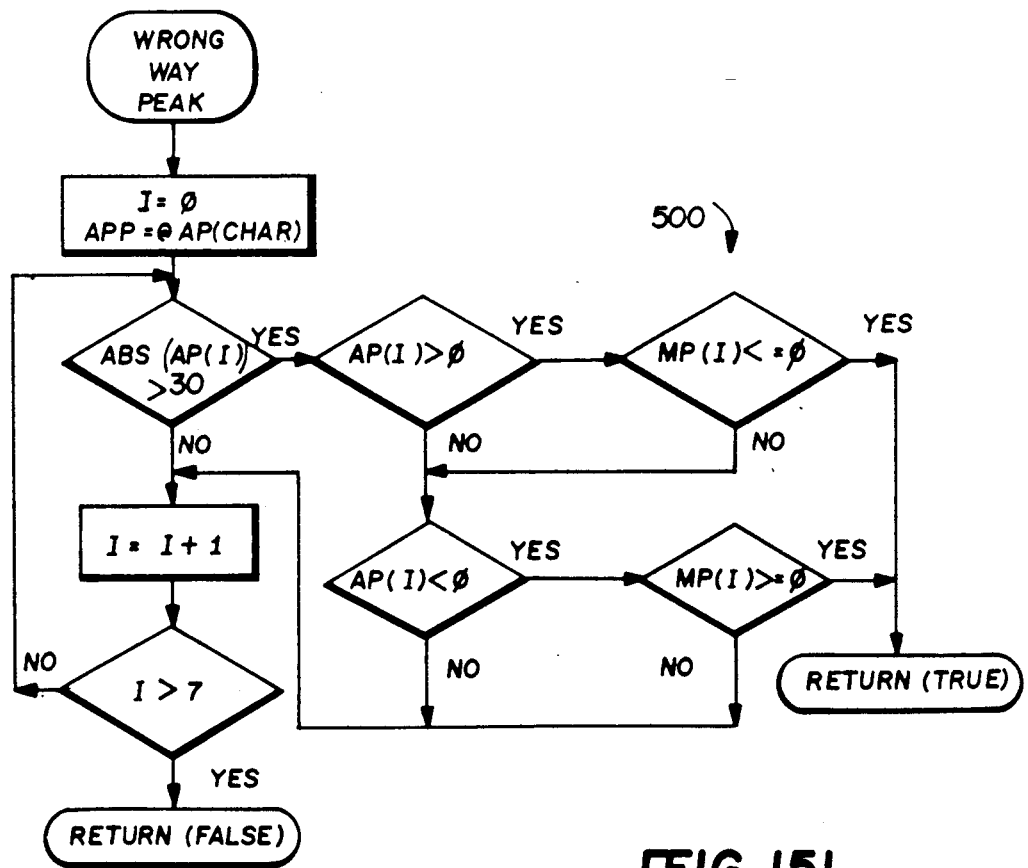

Flow charts 15L, 15M and 15N show exemplary program control steps performed for the "wrong way peak" test 500, "required peak test" 504, and "quiet zone test" 508 in the preferred embodiment. These flow charts are relatively self-explanatory when studied in conjunction with the waveform diagrams shown in FIGS. 16A-16B. Briefly, for the "wrong way peak" test 500 shown in FIG. 15L, various peaks identified by block 496 shown in FIG. 15I are compared with expected peak threshold levels. In the preferred embodiment, all peaks are tested for "wrong polarity" except for the small peak in the center at 0.039 inch mark for the MICR character 6. The occurrence of significant peaks of the opposite polarity are a sufficient basis to determine that the character cannot be identified.

Figure 15M:
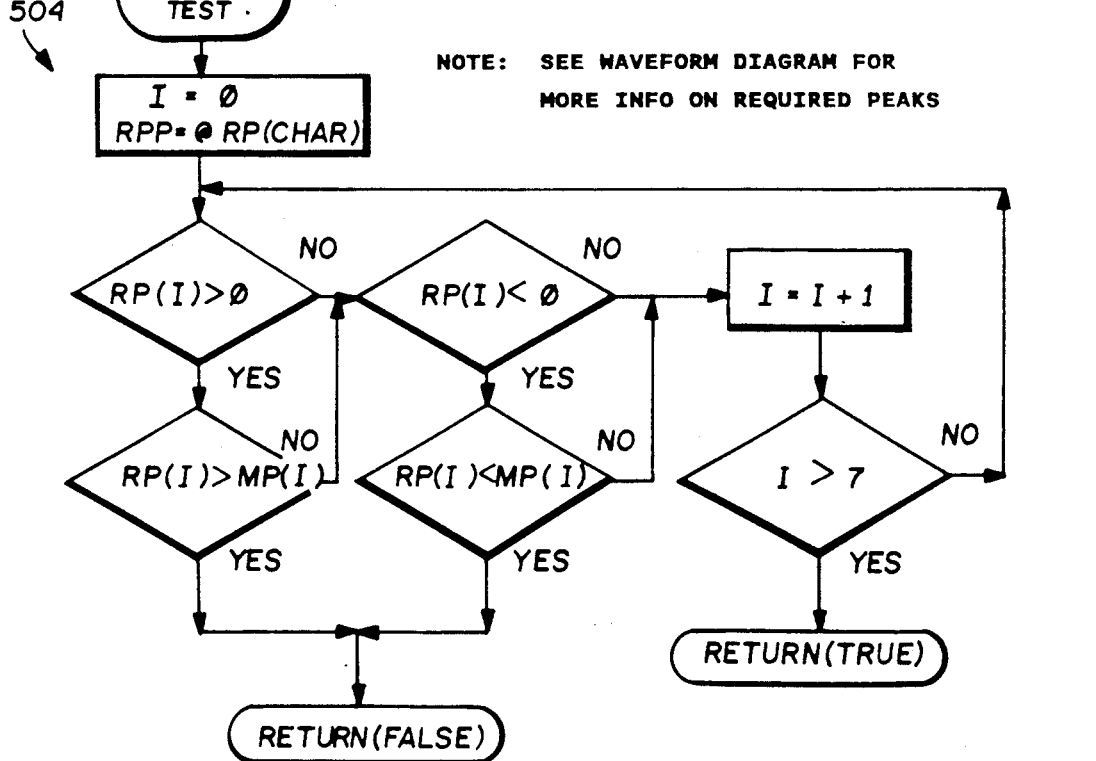
Figure 15N:
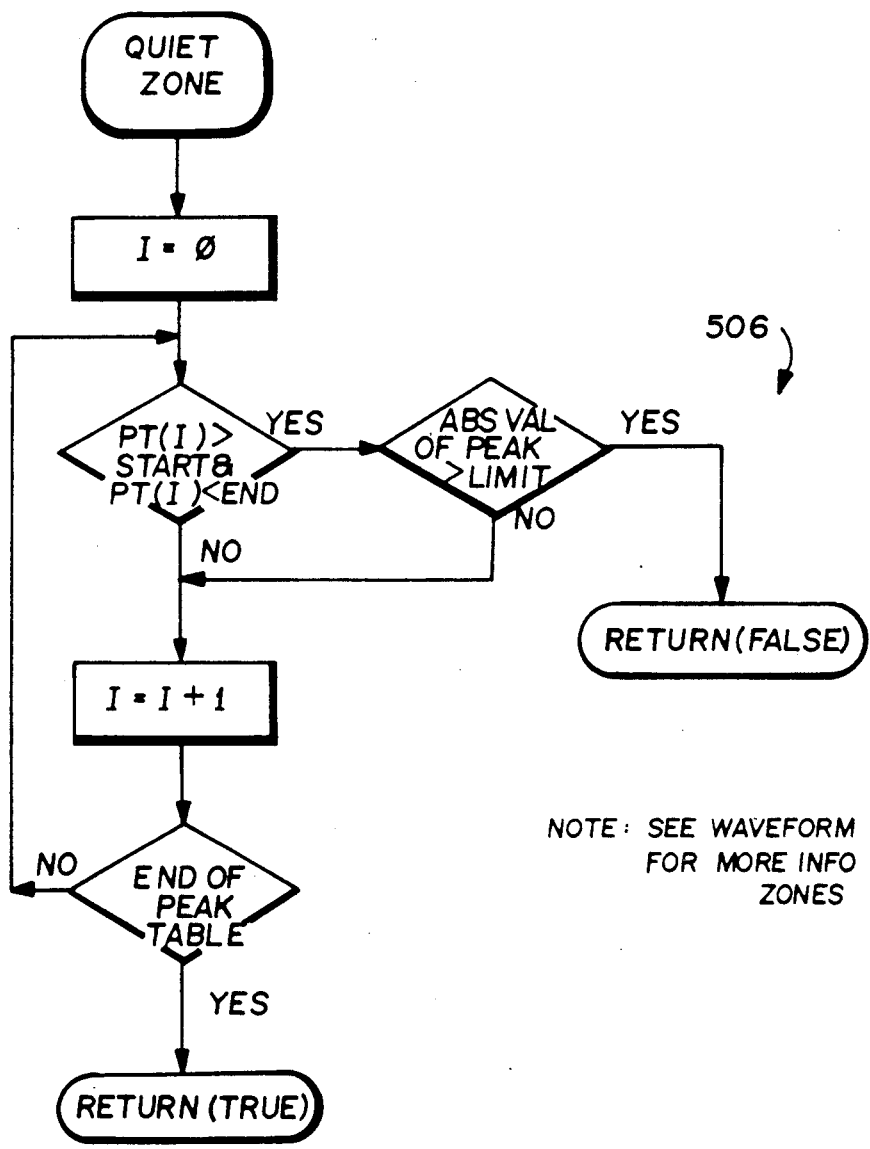

Referring the FIG. 15M, "required peak test" 504 is used to insure that required peaks are present in the sampled waveform. Required peaks are shown in FIGS. 16A and 16B for each character. Briefly, this test compares the sample amplitude with expected positive and negative threshold levels corresponding to significant peaks of the idealized MICR character which decoding routine 370 has identified. If the set of sample data does not include data corresponding to a required peak of the character previously tentatively identified by decode character routine 370, it is decided that the MICR character cannot be identified and a "?" character code is required.

Finally, certain characters may be tested to insure that no significant signal levels are present in "quiet zones." For example, "short" characters such as 1, 3, 4, 5, 7, and 9 should not produce any significant signal levels in segments following the character. The preferred embodiment looks for the absence of signal levels in (a) the last segment for the characters 1, 2, 3, 4, 5, 6, 7 and 9; (b) in the second to last (sixth) segment for the characters 1, 2, 3, 5 and 7; and (c) in the fifth segment for the characters 1 and 2. For example, the MICR character 1 has a width of four segments followed by three empty segments. Therefore, (referring to FIG. 16A), the trailing edge of the fourth segment generates a pulse (negative) at the distance corresponding to 0.052 inches. Since there is no more magnetic material after the fourth segment, there will be no pulses generated by the three segments following this fourth segment. Therefore, in the preferred embodiment, samples corresponding to these three segments are tested for the absence of both positive and negative signal levels.

Another type of "quiet zone" exists within the center of the characters 0, 5 and 8. The MICR character 0 has a 3-segment wide area within its center which ideally should generate no positive or negative peaks. However, suppose imperfections in the magnetic material (e.g., a void) cause noise to be generated in a center segment of a MICR character 0. The preferred embodiment may test for these quiet zones as well, but takes this possible presence of noise into account when doing so (and thus does not require that the quiet zones within, for example, the center of a character 0 or 5 be absolutely quiet, but rather permits low level noise signals to exist within the center of these characters). Thus, quiet zone test 506 sets the limit threshold level for comparison differently for each MICR character, and then compares the absolute value of the sample(s) under test with this level. The threshold levels for characters 0 and 5 are considerably higher than the threshold levels for the other characters.

If character check routine 498 determines that the features which should be present in the MICR character waveform are in fact present and that no significant features are present which should not be there, it passes the character code generated by the decode character routine 388 onto the "output MICR character" routine 306 shown in FIG. 13. Routine 306 is simply a conventional RS-232 serial data output routine which passes a string of MICR character codes (in ASCII in the preferred embodiment) produced by decode logic routine 388 to the RS-232 line-driver/receivers 262 for transmission to external device 24. This string of character codes identifies the characters imprinted on the document in a left-to-right order regardless of whether the document passed through reader 10 from right-to-left or from left-to-right.

A low cost, highly accurate magnetic character recognition device has been described which magnetically recognizes magnetic ink characters imprinted on documents manually conveyed past a magnetic read head. The device incorporates the invention described in commonly assigned U.S. Pat. No. 4,143,355 to MacIntyre to permit relaxation of the requirement of constant document velocity—and in fact, the velocity of the document as it is moved manually past the read head generally varies greatly and cannot be predicted in advance. The device includes certain novel mechanical features (e.g., a particular conveyance slot configuration and dimensions as well as a particular idler wheel and associated biasing device configuration) which facilitate manual conveyance of the document and add rigidity to the document during conveyance. In addition, the device is capable of accurately reading the characters from the document regardless of the direction the document is moved past the read head. The compactness, low cost, high accuracy and versatility of the device make it ideal for use in applications where a MICR reader has in the past been impractical—such as in point of sale and bank teller terminals.

While the invention has been described in connection with what is presently considered to be the most practical and preferred embodiment, it is to be understood that the invention is not to be limited to the disclosed embodiment. As one example, although the preferred embodiment recognizes the E13-B MICR font, recognition of other magnetic fonts (e.g., CMC-7) is also possible. The invention is intended to cover various modifications and equivalent arrangements included within the spirit and scope of the appended claims.

What is claimed is:

1. Apparatus for magnetically reading and recognizing plural magnetic ink characters disposed sequentially on a surface of a document during manual conveyance of said document relative to a magnetic reading station, said apparatus comprising:

structure which permits human hand movement to propel relative movement between said document and said magnetic reading station, said structure permits relative movement in a first direction and in a second direction which is opposite to said first direction;

said magnetic reading station including electromagnetic transducer means operatively coupled to said document surface for producing a first electrical signal representing magnetic characteristics of said characters during relative movement occurring between said characters and said reading station;

position sensing means for producing electrical position signals indicating a sequence of spaced apart document positions as said document and said magnetic reading station move relative to one another, said position sensing means is operative to sense position for said relative movement occurring in either of said first and second directions;

said apparatus further includes direction indicating means coupled to said position sensing means for producing a direction indicating signal indicating the direction said document is conveyed; and character identifying means responsive to said first signal and said position signals for producing electrical output signals that accurately identify said plural characters when said manually propelled relative movement occurs between said document and said magnetic reading station at variable velocities within a velocity range of between 5 inches per second and 110 inches per second said character identifying means produces said electrical output signals in response to either direction of said relative movement;

means for sampling said first electrical signal in response to said position signal and for storing said samples; and means connected to receive said direction indicating signal for analyzing said stored samples in an order responsive to said direction indicating signal.

2. Apparatus as in claim 1 wherein:

said apparatus further includes direction indicating means responsive to said relative movement for producing a direction indicating signal; and said character identifying means includes means connected to receive said direction indicating signal for analyzing features of said first electrical signal in a predetermined order selected in response to said direction indicating signal.

3. A hand-operated system for identifying a magnetic ink character positioned upon a substantially planar document during a read operation whereby the document is manually conveyed past a magnetic read station, said system comprising:

means defining a slotted path sized and configured to accept the document and to provide lateral support for the document sufficient to maintain the document in its substantially planar state during manual conveyance of the document along said defined slotted path;

movement-sensing means operatively positioned relative to said path for sensing movement of said document relative to said magnetic read station during said manual document conveyance;

position signal sensing means coupled to said movement sensing means for generating an electrical position signal in response to said sensed document movement by said movement-sensing means said system further includes direction indicating means coupled to said position sensing means for producing a direction indicating signal indicating the direction said document is conveyed;

magnetic read head means operatively disposed along the path at said magnetic read station for generating an electrical read signal in response to passage of said character thereby as said document is manually conveyed along said path; and recognition means connected to receive position and read signals for generating an output signal indicating the identity of said character, said recognition means accurately identifying said character despite wide variations in said document speed due to manual conveyance of said document said recognition means includes means for sampling said electrical read signal in response to said position signal and for storing said samples, and means connected to receive said direction indicating signal for analyzing said stored samples in an order responsive to said direction indicating signal.

4. A system as in claim 3, wherein said movement-sensing means includes:

idler means for frictionally engaging said document and for moving in response to said manual document conveyance past said magnetic read head means, and document urging means located in confronting relationship to said idler means for establishing therebetween a nip region through which said document passes as it is manually conveyed along said slotted path, and for urging the document into frictional engagement with said idler means, which frictional engagement causes said idler means to move in response to said document conveyance.

5. A system as in claim 4, wherein said idler means includes a friction surface engagable with said document during said manual document conveyance.

6. A system as in claim 3, wherein said slotted path defining means includes an opposed pair of upright track members each of which defines a substantially planar surface which is spaced in parallel from the planar surface of the other of said track members so as to establish a slot of predetermined dimension therebetween.

7. A system as in claim 6, wherein said track members also collectively define, at least at one end thereof, a pair of guide surfaces which converge towards said established slot and thus assist in the guiding of the document thereto.

8. A system as in claim 6, wherein each end of said track members collectively define said pair of guide surfaces.

9. A system as in claim 4, wherein said document urging means includes means defining a smoothly convex surface in confronting relationship to said idler means, and means for biasing said convex surface towards said friction surface portion.

10. A system as in claim 9, wherein said convex surface and said biasing means are provided as a unitary structure in the form of a leaf spring.

11. A system as in claim 4, wherein said idler means includes a wheel and a friction surface which constitutes a circumferential extent of said wheel, shaft means for establishing a rotational axis, and means for journally mounting said wheel and/or said shaft means for rotational movement about said axis.

12. A system as in claim 11, wherein said position signal generating means includes a disc which is coaxially mounted to said shaft means and rotates in synchronism with said wheel.

13. A system as in claim 3, further including means positioned at least upstream of said magnetic read head means relative to one direction of said manual document conveyance for generating a magnetic field to magnetize said magnetic ink character as the document is conveyed along said path in said one direction.

14. A system as in claim 13, wherein said magnetic field generating means is positioned both upstream and downstream of said magnetic read head means so that said magnetic ink character is magnetized when said document is conveyed along said path in said one direction and in another direction opposite to said one direction.

15. A system as in claim 14, wherein said magnetic field generating means is a permanent magnet.

16. A system for recognizing an aligned series of magnetic characters imprinted upon a manually conveyed document, said system comprising:

a slotted member which includes (i) an opposing pair of parallel planar side walls, (ii) a bottom wall that is joined to said side walls in such a manner that said side walls are separated from one another by a predetermined dimension to establish a conveyance path for the document therebetween, wherein said sides walls are vertically oriented relative to said bottom wall, and wherein said side walls provide lateral support for the document wherein said circuit means includes a sample circuit which samples said recognition signal when said position signal occurs as it is manually conveyed between said side walls without substantial drag being imparted thereto so that the document is in a substantially planar state conforming to said planar side walls;

mechanical encoder means driven in response to said manual document conveyance along said defined path for generating a position signal indicating positions along said manually conveyed document;

magnetic read head means positioned operatively along said path for producing an electrical recognition signal in response to passage of said characters thereby during conveyance of said document relative thereto in response to force imparted by a human hand; and circuit means operative in response to receiving said position and recognition signals for generating an output signal identifying said characters, said circuit means reliably identifying said characters for wide variations of speed as exhibited by said manually conveyed document.

17. A system as in claim 16 wherein said side walls terminate at a height sufficient to expose an upper region of the document when positioned within said slotted member in said conforming substantially planar state to thereby permit a user to grasp said exposed upper document region and thus manually convey the document in a preselected direction along said conveyance path defined by said opposing side walls.

18. A system as in claim 16, wherein said encoder means includes an endless idler member having a friction surface, at least a portion of said friction surface being positioned substantially tangentially relative to said path.

19. A system as in claim 18, wherein said encoder means includes document urging means located in confronting relationship to said friction surface portion of said idler member for establishing therebetween a nip region through which said document passes as it is manually conveyed along said path, and for urging the document into frictional engagement with said friction surface of said idler member, which frictional engagement drives said idler member in synchronous response to said document conveyance along said path.

20. A system as in claim 19, wherein said document urging means includes means defining a smoothly convex surface in confronting relationship to said friction surface portion of said idler member, and means for biasing said convex surface towards said friction surface portion.

21. A system as in claim 20, wherein said convex surface and said biasing means are provided as a unitary structure in the form of a leaf spring.

22. A system as in claim 16, wherein said slotted member, at least at one end thereof, also defines a pair of guide surfaces which converge toward said defined conveyance path.

23. A system as in claim 16, wherein said slotted member, at each of its opposing ends, also defines a pair of guide surfaces which converge toward said defined conveyance path.

* * * * *